United States Patent
O'Connor et al.

(10) Patent No.: US 9,244,172 B2
(45) Date of Patent: Jan. 26, 2016

(54) SELECTION OF A SUBSET OF GLOBAL NAVIGATION SATELLITE SYSTEM MEASUREMENTS BASED ON PREDICTION OF ACCURACY OF TARGET PARAMETERS

(71) Applicant: Topcon Positioning Systems, Inc., Livermore, CA (US)

(72) Inventors: Raymond M. O'Connor, Pleasanton, CA (US); Ivan Giovanni Di Federico, Argenta (IT); Sergey Averin, Obninsk (RU); Daniel Milyutin, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 558 days.

(21) Appl. No.: 13/920,427

(22) Filed: Jun. 18, 2013

(65) Prior Publication Data
US 2013/0342396 A1 Dec. 26, 2013

Related U.S. Application Data

(60) Provisional application No. 61/661,881, filed on Jun. 20, 2012.

(51) Int. Cl.
*G01S 19/28* (2010.01)
*G01S 19/05* (2010.01)

(52) U.S. Cl.
CPC *G01S 19/05* (2013.01); *G01S 19/28* (2013.01)

(58) Field of Classification Search
IPC .................................................. G01S 19/28
See application file for complete search history.

(56) References Cited

U.S. PATENT DOCUMENTS 7,825,855 B1 11/2010 Nicholson
2006/0114151 A1 6/2006 Iwami
(Continued)

FOREIGN PATENT DOCUMENTS

EP 2 120 060 11/2009

OTHER PUBLICATIONS

Wei et al., "A New Satellite Selection Algorithm for Real-Time Application," May 19, 2012, pp. 2567-2570, Systems and Informatics (ICSAI), 2012 International Conference On, IEEE.
(Continued)

*Primary Examiner* — Tashiana Adams
*Assistant Examiner* — Fred H Mull
(74) *Attorney, Agent, or Firm* — Chiesa Shahinian & Giantomasi PC

(57) ABSTRACT

An optimum measurement subset with a specified number n of elements is generated from a set of N>n weighted input global navigation satellite system (GNSS) measurements. A group of trial measurement subsets is generated by removing a different individual weighted input GNSS measurement from the set. A value of accuracy criterion for a target parameter is calculated for each trial measurement subset, and the trial measurement subset with the minimum value of accuracy criterion is selected. A new group of trial measurement subsets is generated by removing a different individual weighted GNSS measurement from the previously selected trial measurement subset. A value of accuracy criterion is calculated for each new trial measurement subset, and a new trial measurement subset with the new minimum value of accuracy criterion is selected. The process is repeated until the selected trial measurement subset has the specified number n of elements.

22 Claims, 9 Drawing Sheets

(56) References Cited

U.S. PATENT DOCUMENTS

2011/0057833 A1  3/2011  France et al.
2013/0342393 A1  12/2013  O'Connor et al.

OTHER PUBLICATIONS

Blanco-Delgado et al., "Satellite Selection Method for Multi-Constellation GNSS Using Convex Geometry," Nov. 1, 2010, IEEE Transactions on Vehicular Technology, IEEE Service Center, Piscataway, NJ, USA, vol. 59, No. 9.
Park et al., "Quasi-Optimal Satellite Selection Algorithm for Real-time Applications," Sep. 14, 2001, Proceedings of the 14th International Technical Meeting of the Satellite Division, ION GPS 2001, pp. 3018-3028, Retrieved from the Internet: URL:http://ion.org/publications/abstract.cfm?articleID=1978, retrieved on Aug. 16, 2013.
Song et al., "An Algorithm of Selecting More than Four Satellites from GNSS," Jan. 1, 2013, Retrieved from the Internet: URL.www.atlantis-press.com, retrieved on Aug. 16, 2013.
Li et al., "GNSS Satellite Selection Algorithm Revisited: A Weighted Way with Integrity Consideration" In: "China Satellite Navigation Conference (CSNC) 2013 Proceedings", Jan. 1, 2013, Springer Berlin Heidelberg, Berlin, Heidelberg, vol. 244, pp. 173-187.
Liu et al., "A Recursive Quasi-Optimal Fast Satellite Selection Method for GNSS Receivers," Sep. 25, 2009, Proceedings of the 22nd International Technical Meeting of the Satellite Division of the Institute of Navigation, ION GNSS 2009, Savannah, GA, Retrieved from the Internet: URL:http://www.ion.org/publications/abstract.cfm?articleID=8618, retrieved on Aug. 16, 2013.
Miaoyan et al., "Satellite Selection for Multi-Constellation," Aug. 5, 2008, Position Location and Navigation Symposium, Piscataway, NJ, USA, IEEE.

SELECTION OF A SUBSET OF GLOBAL NAVIGATION SATELLITE SYSTEM MEASUREMENTS BASED ON PREDICTION OF ACCURACY OF TARGET PARAMETERS

CROSS-REFERENCE TO RELATED APPLICATIONS

This application claims the benefit of U.S. Provisional Application No. 61/661,881 filed Jun. 20, 2012, which is incorporated herein by reference in its entirety. This application is related to U.S. patent application Ser. No. 13/920,435 filed Jun. 18, 2013, which is being filed concurrently herewith and which is herein incorporated by reference in its entirety.

BACKGROUND OF THE INVENTION

The present invention relates generally to global navigation satellite systems, and more particularly to selection of a subset of global navigation satellite system measurements.

Global navigation satellite systems (GNSSs) enable determination of target parameters, such as position, velocity, and time (PVT) for users equipped with receivers of GNSS signals. Currently deployed global navigation satellite systems are the United States Global Positioning System (GPS) and the Russian GLONASS. Other global navigation satellite systems, such as the European GALILEO system, are under development. In a GNSS, a navigation receiver receives and processes radio signals transmitted by satellites located within a line-of-sight of the receiver. The satellite signals comprise carrier signals modulated by pseudo-random binary codes. The receiver measures the time delays of the received signals relative to a local reference clock or oscillator. Code phase measurements enable the receiver to determine the pseudo-ranges between the receiver and the satellites. The pseudo-ranges differ from the actual ranges (distances) between the receiver and the satellites due to an offset between the time scales of the GNSS and the receiver. If signals are received from a sufficiently large number of satellites, then the measured pseudo-ranges can be processed to determine the coordinates and the offset between the time scales of the GNSS and the receiver. This operational mode is referred to as a stand-alone mode, since the measurements are determined by a single receiver. A stand-alone system typically provides meter-level accuracy of positioning.

To improve the accuracy of positioning, differential navigation (DN) systems have been developed. In a DN system, the position of a user is determined relative to a base station, also referred to as a base. The base is typically fixed, and the coordinates of the base are precisely known; for example, by surveying. The base contains a navigation receiver that receives satellite signals and that can determine the corrections to GNSS measurements based on the known base position. In some DN systems, the raw measurements of the base can serve as corrections.

The user, whose position is to be determined, can be stationary or mobile; in a DN system, the user is often referred to as a rover. The rover also contains a navigation receiver that receives GNSS satellite signals. Corrections generated at the base are transmitted to the rover via a communications link. To accommodate a mobile rover, the communications link is often a wireless link. The rover processes the corrections received from the base, along with measurements taken with its own receiver, to improve the accuracy of determining its position. Accuracy is improved in the differential navigation mode because errors incurred by the receiver at the rover and by the receiver at the base are highly correlated. Since the coordinates of the base are accurately known, measurements from the base can be used for calculating corrections, thus compensating the errors at the rover. A DN system provides corrections to pseudo-ranges measured with code phase.

The position determination accuracy of a differential navigation system can be further improved if the pseudo-ranges measured with code phase are supplemented with the pseudo-ranges measured with carrier phase. If the carrier phases of the signals transmitted by the same satellite are measured by both the navigation receiver in the base and the navigation receiver in the rover, processing the two sets of carrier phase measurements can yield a position determination accuracy to within several percent of the carrier's wavelength. A differential navigation system that computes positions based on real-time carrier phase pseudo-range measurements, in addition to the code phase pseudo-range measurements, is often referred to as a real-time kinematic (RTK) system. Processing carrier phase measurements to determine coordinates includes the step of ambiguity resolution; that is, determining the integer number of cycles in these measurements acquired by the navigation receiver from an individual satellite.

Applications based on GNSSs have become increasingly popular as the number of available GNSS satellites has increased and as the cost of GNSS receivers has decreased. Measurements from a minimum of four satellites can determine three-dimensional position and time; however, measurements from additional satellites can be used to improve accuracy. Typically, more than four satellites are in view, and redundant measurements are available. Previous generations of receivers were not capable of tracking all the GNSS satellites in view due to hardware limitations; thus, a subset of the satellites in view had to be selected such that the subset provided the best performance, that is, the best accuracy of the PVT solution. This selection process was equivalent to selecting a subset of measurements from the set of available measurements.

The current generation of receivers do not have such hardware limitations; in addition, they can simultaneously process signals transmitted on different frequency bands (for example, both L1 and L2), and they can simultaneously process signals transmitted from different GNSSs (for example, from both GPS and GLONASS). As the capability to track more signals increases, however, the required computational power of the receiver increases. In general, increased computational power requires more complex hardware, higher power consumption, and higher cost. Selecting an optimum subset of measurements from all available measurements, therefore, is still advantageous for producing receivers with smaller size, lower power consumption, and lower cost.

The general problem addressed herein can then be formulated as follows. The total number of available measurements is N. Assume that, with given constraints of computational resources and computational time, only n measurements (where n is an integer, and n<N) are to be selected for computing target parameters within a specified accuracy. Examples of target parameters include position, velocity, and time. Which subset of n measurements selected from the set of available N measurements will yield the best accuracy for the target parameters? This subset is referred to as the optimum measurement subset for the target parameters.

Several approaches have been used to select the optimum measurement subset. One previous approach is based on analysis of the signal-to-noise ratio (SNR) or signal power. Assume that n measurements are to be selected out of N measurements. Under this approach, all satellite measurements are ranked in accordance with SNR or signal power values. Then, the n measurements with the highest SNR or signal power values are selected and used for further processing.

Another previous approach is based on analysis of satellite elevation angle. Measurements from low-elevation satellites are subject to multipath reflection, refraction, and attenuation arising from various signal obstacles and obstructions. In this approach, the measurements that come from satellites below a particular elevation threshold are rejected, and the measurements that come from satellites above the elevation threshold are retained for calculating positions, velocities, or time.

Approaches based on analysis of SNR, signal power, and elevation angle values have the advantage of requiring relatively low computer resources; however, they do not provide optimum accuracy of the PVT solution.

In contrast with the above approaches, analysis of Dilution of Precision (DOP) values provides selection of the measurements that produce the PVT solution with the best accuracy; however, the DOP approach requires substantially more computer resources. The DOP approach for selecting optimum measurements is summarized below.

The DOP approach is based on a general approach in accordance with the Least Squares Method (LSM). The measurement equation is expressed as:

$$y = Hx, \quad (E1)$$

where:
y is a measurement vector;
X is a vector of unknowns; and
H is a design matrix that relates y and X.

In accordance with the LSM, the vector of unknowns is determined as follows:

$$x = (H^T W H)^{-1} H^T W y. \quad (E2)$$

Here W is a diagonal weight matrix:

$$W = \begin{bmatrix} \sigma_1^{-2} & 0 & \ldots & 0 \\ 0 & \sigma_2^{-2} & \ldots & 0 \\ \ldots & \ldots & \ldots & \ldots \\ 0 & 0 & \ldots & \sigma_N^{-2} \end{bmatrix}, \quad (E3)$$

where:
$\sigma_i$ are coefficients characterizing measurement errors of the i-th element in the y-vector; and
N is the total number of measurements.
The P matrix is introduced as follows:

$$P = (H^T W H)^{-1}. \quad (E4)$$

This P matrix is the solution covariance matrix; it can be used for evaluating solution accuracy based on the relationship between measured parameters, target parameters, and measurement weights. Then, the DOP value is denoted as:

$$DOP = \sqrt{\sum_{i \in [L]} P_{i,i}}, \quad (E5)$$

where:
[L] is an index for the variables used; and
$P_{i,i}$ is the diagonal element of the P matrix.

The weights in (E4) can be assigned in a variety of ways. In one method, User Ranging Accuracy (URA) and the satellite "health" information in the navigation data can be used (J. W. Lavrakis and C. Shank, "A Study into the Use of URA in Satellite Selection," Proceedings of the 49th Annual Meeting of the Institute of Navigation, 1993). In a second method, modeled values of ionospheric and tropospheric delays based on the elevation angle can be applied (P. Chansik et al., "A satellite selection criterion incorporating the effect of elevation angle in GPS positioning", Control Engineering Practice, vol. 4, 1996). In a third method, SNR (Y. Yang, et al, "GDOP results in all-in-view positioning and in four optimum satellites positioning with GPS PRN codes ranging", Position Location and Navigation Symposium, Piscataway, N.J., USA: IEEE, 2004) or signal power (M. C. Moreau, "GPS receiver architecture for autonomous navigation in high earth orbits", Colorado, United States: PhD Thesis, University of Colorado at Boulder, 2001) is used for assigning weights.

There is another commonly used approach for calculating DOP, developed earlier than (E4) above. It relates to a less general case in which all weights are equal to 1, or to a particular value that can be separated as a common factor; the P matrix then reduces to:

$$P = (H^T H)^{-1}. \quad (E6)$$

Depending on the composition of the design matrix and the L index, the following metrics can be used for selecting optimum measurements: Geometrical DOP (GDOP), Position DOP (PDOP), Horizontal DOP (HDOP), Vertical DOP (VDOP), and Time DOP (TDOP). Other metrics can be used as well.

The criterion for measurement selection is based on the following relationship: as the DOP decreases, the accuracy of the PVT solution increases. Thus, n measurements are selected from N available measurements to yield the smallest DOP. This approach for selecting optimum measurements based on DOP analysis is referred to herein as the "classical" approach.

The main drawback of the classical approach is that substantial computational resources are required to compute DOP values for different combinations of measurements. For example, if there is a requirement to select 12 measurements out of 13 measurements, then 13 candidate combinations need to be tested; that number of combinations is generally acceptable. If there is a requirement to select 12 measurements out of 18 measurements, however, then 18,564 candidate combinations need to be tested. This number of combinations is too computationally intensive in practice; especially, if the selection is repeated once per epoch (for example, once per second).

To reduce the computational load, a combination of the three above methods can be applied (that is, selection based on elevation, SNR or signal power, and DOP). One approach to combine all three methods is described in France et al., "Selecting Raw Measurements for Use in Position Computation", U.S. Patent Application Publication No. 2011/0057833. Since a DOP algorithm is still used as part of the overall method, however, the overall method still presents a substantial computational load.

There are additional approaches for selecting a measurement subset with a minimum DOP value. These approaches require fewer computational resources, but they are not reliable. The selected subsets sometimes do provide the minimum DOP value, but sometimes they do not. A popular satellite selection algorithm is called "Lear's simple satellite selection algorithm"; it is more widely known as the "Highest Elevation" algorithm [W. M. Lear, "Proposed Simplified GPS Navigation Filters", Johnson Space Center Internal Note JSC-25468, February, 1992]. The highest satellite is first selected, and then satellites are added according to best-match criteria depending on azimuthal separation. The second selected satellite is 90° away from the first; the third selected satellite is perpendicular to the plane formed by the first two; the fourth and the fifth satellites are selected to minimize PDOP. This approach produces reasonably good results with a very small computational load, and it can be extended to selecting more than five satellites.

When selecting four satellites, the optimally selected satellites form a tetrahedron around the receiver. The volume of the tetrahedron is inversely proportional to the corresponding GDOP. Thus, by maximizing the volume, GDOP is minimized (M. Kihara and T. Okada, "A Satellite Selection Method and Accuracy for the Global Positioning System", Journal of Navigation, vol. 31, pp. 8-20, 1984).

Numerous algorithms have been developed based on this approach; however, they are limited to selecting four satellites. An approach described by M. Zhang et al. (M. Zhang et al. "Satellite selection for multi-constellation", Position Location and Navigation Symposium, Piscataway, N.J., USA, IEEE, 2008) accommodates additional satellites. Their approach allows selecting 5 to 16 satellites such that two to five satellites lie at zenith while others are uniformly distributed along the horizon circle. Their simulation results show an average of 5.79% GDOP increase compared with the results calculated with the optimal algorithm, and a 50% GDOP increase in a worst case.

Another approach that permits the selection of any desired number of satellites from those in view is based on the calculation of cost functions for every satellite (C. W. Park and J. P. How, "Quasi-Optimal Satellite Selection Algorithm for Real-Time Applications", Proceedings of the 14th International Technical Meeting of the Satellite Division, ION GPS 2001, 2001, pp. 3018-3028). The cost functions for a particular satellite are calculated as sums of cosines of spatial separation angles between the particular satellite and other satellites. The satellites with minimum cost functions are selected.

Another approach is described in "A Recursive Quasi-optimal Fast Satellite Selection Method for GNSS Receivers" by Min Liu et al., Proceedings of the 22nd International Technical Meeting of The Satellite Division of the Institute of Navigation (ION GNSS 2009), Sep. 22-25, 2009, Savannah, Ga. This approach is based on estimating the DOP values, but, in order to save processing power, it is done sub-optimally. According to this approach, on the first step, each satellite is excluded one-by-one, while the others are retained, and the subset (first subset) with the smallest DOP is selected. On the second step, from the first subset, each satellite is excluded one-by-one, while the others are retained, and the new subset (second subset) with the smallest DOP is selected. The selection process is repeated until the desired number of satellites remain. To reduce processor load, calculation of DOP at each step is done iteratively, based on the results of the previous step.

What is needed is a method for selecting an optimum measurement subset that yields an accuracy for target parameters very close to or equal to the accuracy resulting from the optimum measurement subset determined by the dilution of precision analysis, but requires less computational resources or less computational time than the dilution of precision analysis.

BRIEF SUMMARY OF THE INVENTION

An optimum measurement subset is generated from a set of weighted input global navigation satellite system (GNSS) measurements. The number of weighted input GNSS measurements in the set of weighted input GNSS measurements is a first integer, and the number of weighted input GNSS measurements in the optimum measurement subset is a specified second integer, where the specified second integer is less than the first integer.

The following steps are first performed.

The set of weighted input GNSS measurements is received.

A group of trial measurement subsets is generated by removing a different individual weighted input GNSS measurement from the set of weighted input GNSS measurements.

For each trial measurement subset in the group of trial measurement subsets, a value of accuracy criterion for at least one target parameter is calculated.

A minimum value of accuracy criterion based on the values of accuracy criterion calculated for each trial measurement subset in the group of trial measurement subsets is determined.

The trial measurement subset having the minimum value of accuracy criterion is assigned as a current selected trial measurement subset.

The following steps are then iteratively performed.

A determination is performed as to whether the number of weighted input GNSS measurements in the current selected trial measurement subset is equal to the specified second integer.

Upon determining that the number of weighted input GNSS measurements in the current selected trial measurement subset is equal to the specified second integer, the current selected trial measurement subset is assigned as the optimum measurement subset.

Upon determining that the number of weighted input GNSS measurements in the current selected trial measurement subset is not equal to the specified second integer:

A new group of trial measurement subsets is generated from the current selected trial measurement subset by removing a different individual weighted GNSS measurement from the current selected trial measurement subset.

For each trial measurement subset in the new group of trial measurement subsets, the value of accuracy criterion for the at least one target parameter is calculated.

A new minimum value of accuracy criterion is determined based on the values of accuracy criterion calculated for each trial measurement subset in the new group of trial measurement subsets.

The trial measurement subset with the new minimum value of accuracy criterion is assigned as the current selected trial measurement subset.

These and other advantages of the invention will be apparent to those of ordinary skill in the art by reference to the following detailed description and the accompanying drawings.

DETAILED DESCRIPTION

Global navigation satellite systems (GNSSs) can operate in various operational modes. Different operational modes require equipment of different complexities and can determine target parameters (such as position, velocity, and time) with different accuracies. The types and quantities of data to be processed also depend on the operational mode. Several operational modes are summarized below.

Figure 1A:
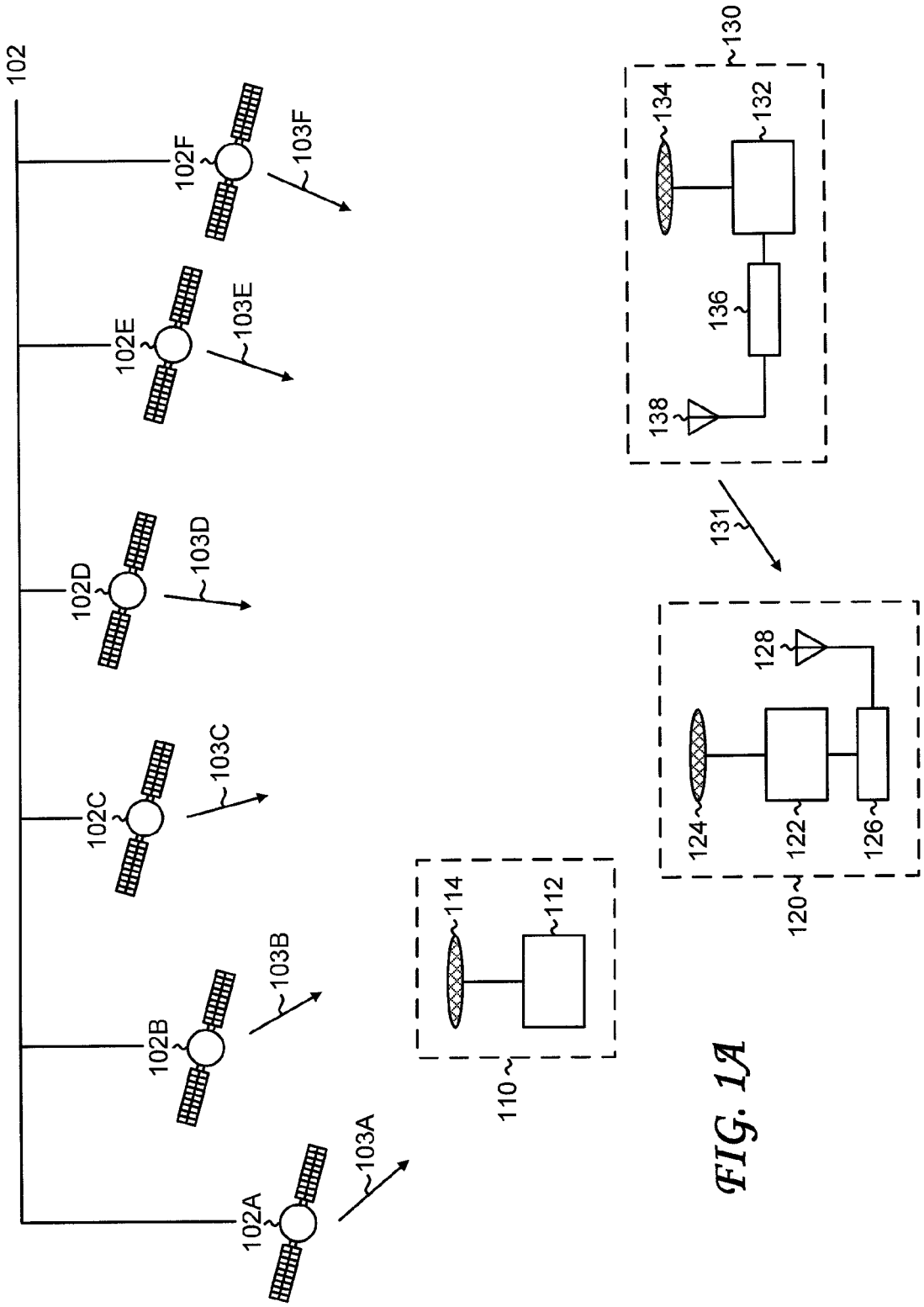
FIG. 1A shows an example of a global navigation satellite system in which the navigation receiver operates in a stand-alone mode or in a single-base-station differential navigation mode.

FIG. 1A shows a high-level schematic of a global navigation satellite system (GNSS). A constellation of global navigation satellites 102 transmits navigation signals. Shown are six representative navigation satellites, denoted navigation satellite 102A-navigation satellite 102F, which transmit navigation signal 103A-navigation signal 103F, respectively. In general, the navigation satellites can belong to more than one global navigation satellite system (for example, GPS and GLONASS).

Refer to the GNSS measurement unit 110, which operates in a stand-alone mode. The GNSS measurement unit 110 includes the antenna 114 and the navigation receiver 112. The antenna 114 receives navigation signals, such as navigation signal 103A-navigation signal 103F; from these navigation signals, the navigation receiver 112 can calculate target parameters, such as time referenced to a GNSS system clock and position and velocity referenced to the antenna 114. In some GNSS measurement units, the antenna is mounted in a fixed relationship with respect to the navigation receiver. If the GNSS measurement unit 110 is carried by a person who is walking or running, the GNSS measurement unit 110 can be used to calculate the position and velocity of the person as a function of time. If the GNSS measurement unit 110 is mounted on a moving vehicle, the GNSS measurement unit 110 can be used to calculate the position and velocity of the vehicle as a function of time.

In other GNSS measurement units, the antenna can be moved with respect to the navigation receiver. In one application, the antenna 114 is mounted on the blade of a bulldozer, and the navigation receiver 112 is mounted inside the cab of the bulldozer; the antenna 114 is coupled to the navigation receiver 112 via a flexible cable. The GNSS measurement unit 110 can then be used to measure the position and velocity of the blade as a function of time. To simplify the discussion below, phrases such as "position of the navigation receiver" or "position and velocity of the navigation receiver" are used; strictly, however, "position" and "velocity" refer to the parameters of the antenna that receives the navigation signals that are then processed by the navigation receiver.

The navigation signals comprise carrier signals modulated by pseudo-random binary codes. The navigation receiver measures the time delays of the received signals relative to a local reference clock or oscillator. Code phase measurements enable the navigation receiver to determine the pseudo-ranges, which in essence are estimates of the distances between the navigation receiver and the navigation satellites. The pseudo-ranges differ from the actual ranges (distances) between the navigation receiver and the navigation satellites due to presence of the term determined by the offset between the time scales of the navigation receiver and the respective GNSS. If navigation signals are received from a sufficiently large number of navigation satellites, then the measured pseudo-ranges can be processed to determine the position of the navigation receiver.

In general, the three-dimensional coordinates of the navigation receiver can be determined; a reference Cartesian coordinate (x, y, z) system can be used. The reference Cartesian coordinate system can be an Earth Centered Earth Fixed (ECEF) system; WGS-84 is an example of an ECEF system. Two-dimensional coordinates along a reference horizontal plane (x-y plane) or a one-dimensional coordinate (Z or height) along an axis normal to the reference horizontal plane can also be determined. The reference horizontal plane can, for example, be tangent to the WGS-84 ellipsoid. A time referenced to a GNSS system clock can also be calculated by the navigation receiver from the navigation signals (which contain timing information). Velocity of the navigation receiver can be calculated by several methods; for example, taking the time derivative of position as a function of time, processing Doppler measurements, or processing carrier phase measurements over a specific interval of time.

Various error sources contribute to errors in determination of the position and time. Examples of error sources are satellite clock errors, satellite ephemeris errors, and variations in propagation velocities of the navigation signals. Time scales of the navigation satellites are referenced to precision atomic on-board clocks and are synchronized with the GNSS time scale; however, there are residual drifts and offsets with respect to that GNSS time scale. Calculations of position, velocity, and time using pseudo-ranges require ephemeris data (orbital positions of the satellites); ephemeris data is encoded on the navigation signals, and is updated in real time periodically. Measured pseudo-ranges are affected by the propagation velocity of the navigation signals between the navigation satellites and the navigation receiver. The propagation velocity depends on the medium and varies as the navigation signal travels through the ionosphere and through the troposphere; instabilities in the ionosphere and troposphere can result in dynamic changes to the propagation velocity.

Some errors can be reduced by operating the GNSS in a differential navigation (DN) mode. Refer again to FIG. 1A. The GNSS measurement unit 130, also referred to as the base station (or base) 130, is fixed or stationary; its coordinates are precisely known (for example, from high-precision surveying measurements). The GNSS measurement unit 120, also referred to as the rover 120, in general is mobile.

The base station 130 includes the antenna 134 and the navigation receiver 132. The antenna 134 receives navigation signals, such as navigation signal 103A-navigation signal 103F. The base station 130 also includes the communications transceiver 136 and the antenna 138. Similarly, the rover 120 includes the antenna 124 and the navigation receiver 122. The antenna 124 receives navigation signals, such as navigation signal 103A-navigation signal 103F. The rover 120 also includes the communications transceiver 126 and the antenna 128. The base station 130 transmits the communications signal 131 (for example, a radiofrequency signal) from the antenna 138. The rover 120 receives the communications signal 131 at the antenna 128.

From the received navigation signals, the navigation receiver 132 at the base station 130 can calculate corrections to the received GNSS measurements with respect to the known position of the base station 130. In some DN systems, raw measurements of the base station can serve as corrections. If the distance between the base station 130 and the rover 120 is relatively small, then many of the errors at the base station 130 and at the rover 120 are correlated. The base station 130 transmits error correction data to the rover 120 via the communications signal 131. The error correction data includes data that can be used to correct errors from the various error sources discussed above, for example. The rover 120 processes the navigation signals and the error correction data to determine the position of the rover 120. The accuracy with which the rover 120 can determine its position in the differential navigation mode is higher than the accuracy with which the GNSS measurement unit 110 can determine its position in the stand-alone mode.

A DN system that broadcasts correction data to pseudo-ranges is often referred to as a differential global positioning system (DGPS), or a differential global navigation satellite system (DGNSS). The position determination accuracy of a DN system can be further improved if the pseudo-ranges measured with code phase are supplemented with the pseudo-ranges measured with carrier phase.

If the carrier phases of the signals transmitted by the same satellites are measured by both the navigation receiver in the base station and the navigation receiver in the rover, processing the two sets of carrier phase measurements can yield a location determination accuracy to within several percent of the carrier's wavelength. A DN system that determines positions based on real-time carrier phase pseudo-range measurements, in addition to the code phase pseudo-range measurements, is often referred to as a real-time kinematic (RTK) system. Processing carrier phase measurements to determine position includes the step of ambiguity resolution; that is, determining the integer number of cycles in these measurements acquired by the navigation receiver from an individual satellite.

More complex DN systems, including RTK systems, are configured as network DN systems. In a network DN system, error correction data for a rover is generated from measurements collected from a group of base stations that are geographically dispersed over a wide area. A network control center processes the measurements from the group of base stations and transmits the error correction data to the rover via various communications links, such as radiofrequency satellite signals or General Packet Radio Service (GPRS). Network DN systems can differ by application areas and target positioning accuracy.

Figure 1B:
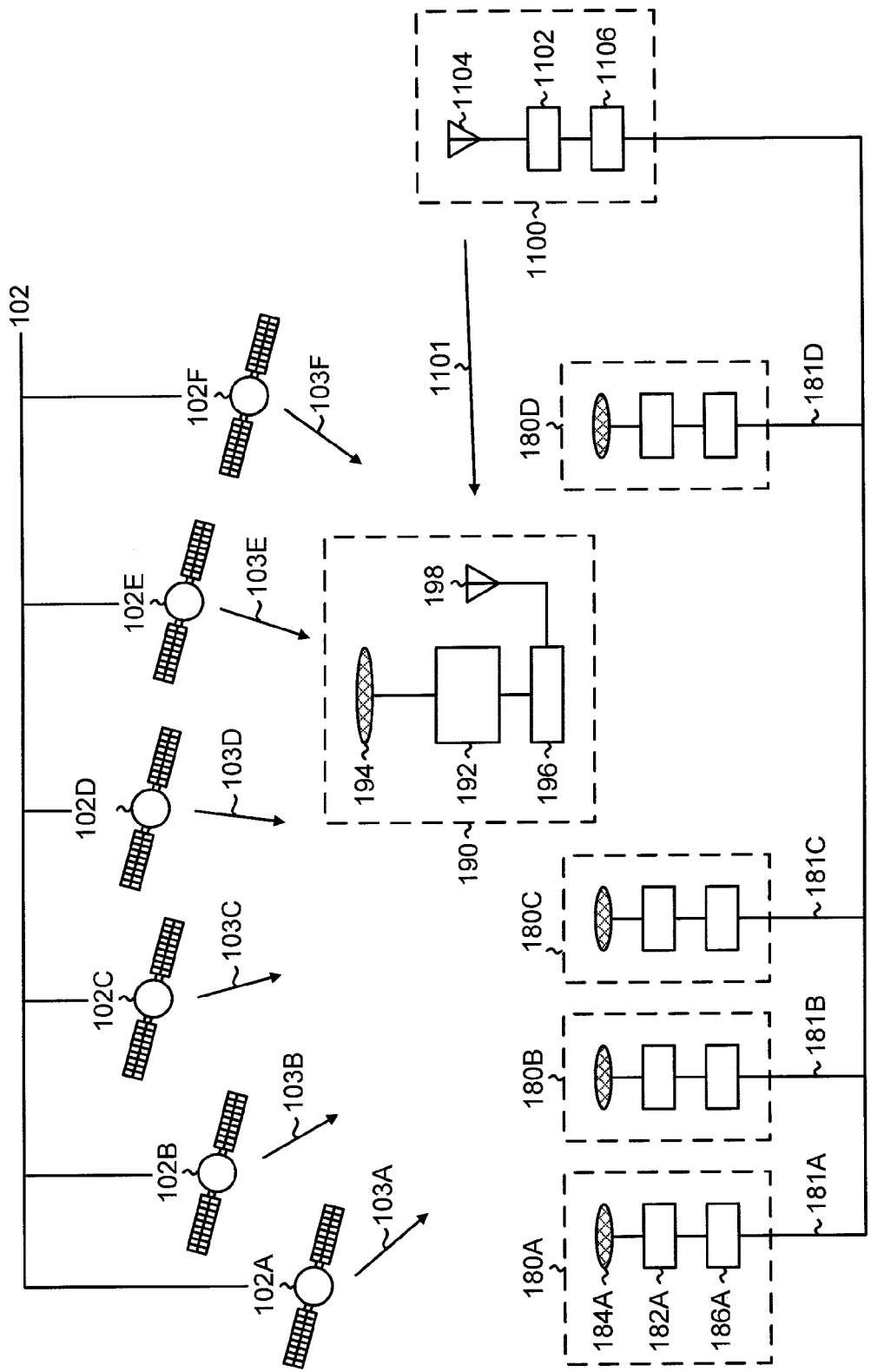
FIG. 1B shows an example of a global navigation satellite system in which the navigation receiver operates in a network differential navigation mode.

FIG. 1B shows an example of a regional (local) network DN system used to provide a network RTK solution; such systems are often referred to as Network RTK systems. Shown are the rover 190 and four representative base stations, denoted base station 180A-base station 180D. The rover 190 includes the antenna 194 and the navigation receiver 192. The antenna 194 receives navigation signals, such as navigation signal 103A-navigation signal 103F. The rover 190 also includes the communications transceiver 196 and the antenna 198. The base station 180A includes the navigation receiver 182A, the antenna 184A, and the data processing and communications unit 186A; base station 180B-base station 180D are each similar to the base station 180A.

In general, the rover and each base station can receive navigation signals from a slightly different subset of navigation satellites in the constellation 102, dependent on observation specifics at the rover and at each base station. Operation of the rover in a RTK mode is possible, however, only using satellite signals received simultaneously by the rover 190 and by at least one of the base stations 180A-180D.

Base station 180A-base station 180D transmit data 181A-data 181D, respectively, to the network control center (NCC) 1100. The data can be transmitted via communications links or via a communications network. The NCC 1100 includes the communications transceiver 1102, the antenna 1104, and the data processing and communications unit 1106. The NCC 1100 receives the data from the base stations as well as the approximate position of the rover and processes these data according to specific algorithms to generate a consolidated set of error correction data corresponding to the rover position (described in more detail below).

The NCC 1100 makes the consolidated set of error correction data available to the rover via various communication channels, such as GPRS. In FIG. 1B, the NCC 1100 delivers the consolidated set of error correction data via the communications signal 1101 (for example, a radiofrequency signal) transmitted from the antenna 1104. The rover 190 receives the communications signal 1101 at the antenna 198. The rover 190 then calculates its position based on measurements collected with its receiver and the consolidated set of error correction data.

The consolidated set of error correction data in network RTK systems can be partitioned into a few groups. The consolidated set of error correction data can include:

Cumulative corrections to both code phase and carrier phase measurements from one or more individual base stations in a group of base stations;

Corrections to code phase and carrier phase measurements for a virtual base station generated from processing GNSS measurements for a group of base stations;

Corrections representing the dispersive part of GNSS measurement errors (measurement errors attributable to the ionosphere) for measurements from one or more individual base stations in a group of base stations;

Corrections representing the non-dispersive part of GNSS measurement errors (measurement errors attributable to the troposphere, satellite ephemeris, and satellite clock data) for measurements from one or more individual base stations in a group of base stations;

Coefficients approximating how various GNSS measurement error components change in space; and Other servicing information.

Figure 1C:
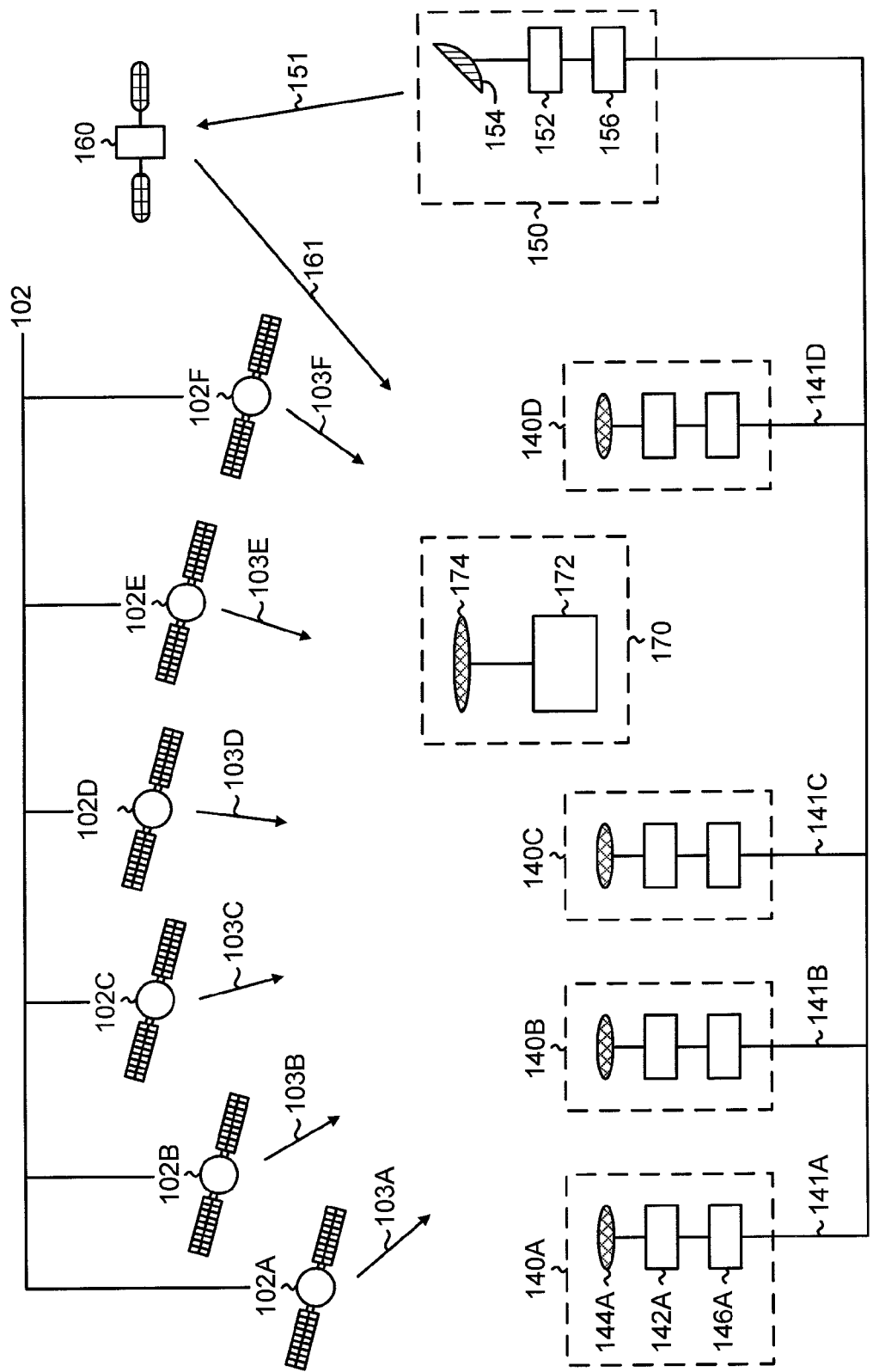
FIG. 1C shows an example of a global navigation satellite system in which the navigation receiver operates in a satellite-based network differential navigation mode.

FIG. 1C shows another example of a network DN system, referred to as a Space Based Augmentation System (SBAS). Shown are the rover 170 and four representative base stations, denoted base station 140A-base station 140D. The rover 170 includes the antenna 174 and the navigation receiver 172. The base station 140A includes the navigation receiver 142A, the antenna 144A, and the data processing and communications unit 146A; base station 140B-base station 140D are each similar to the base station 140A. In general, the rover and each base station can receive navigation signals from a slightly different subset of navigation satellites in the constellation 102, dependent on the specific navigation satellites in view at the rover and at each base station. Operation of the rover in a differential mode is possible, however, only using satellite signals received simultaneously by the rover 170 and by at least one of the base stations 140A-140D.

Base station 140A-base station 140D transmit data 141A-data 141D, respectively, to the network control center (NCC) 150. The data can be transmitted via communications links or via a communications network. The NCC 150 includes the satellite transmitter 152, the antenna 154, and the data processing and communications unit 156. The NCC 150 receives the data from the base stations and processes the data according to specific algorithms to generate a consolidated set of error correction data (described in more detail below). The NCC 150 transmits the consolidated set of error correction data to the geosynchronous (geostationary) relay satellite 160 via the satellite uplink channel 151.

The geosynchronous relay satellite 160 then retransmits the consolidated set of error correction data over a specific region (zone) of the Earth. Multiple geosynchronous relay satellites provide coverage for multiple zones. In FIG. 1C, the rover 170 receives the consolidated set of error correction data from the geosynchronous relay satellite 160 via the satellite signal 161. The rover 170 then calculates its position from the navigation signals and the consolidated set of error correction data. Note that the navigation receiver 172 in the rover 170 needs to be specially equipped to process the satellite signal 161.

The consolidated set of error correction data can be partitioned into a few groups. The consolidated set of error correction data can include:
- Corrections to code phase measurements from one or more individual base stations in a group of base stations;
- Corrections to both code phase and carrier phase measurements from one or more individual base stations in a group of base stations;
- Corrections to orbital (trajectory) parameters and clock parameters of GNSS satellites, specified in the processing of measurements from a group of base stations;
- Corrections to code phase measurements for a virtual base station generated from processing GNSS measurements for a group of base stations;
- Corrections to code phase and carrier phase measurements for a virtual base station generated from processing GNSS measurements for a group of base stations; and
- Other error correction data.

A third example of a network DN system, referred to as Precise Point Positioning (PPP), is similar to network RTK in some aspects, but correction data is presented differently. The architecture of the PPP system is identical to that of the SBAS. Referring to FIG. 1C, a PPP system includes a network of base stations 140A-140D distributed regionally or globally. They send their data to the network control center (NCC) 150. The NCC 150 receives the data from the base stations and processes the data according to specific algorithms to generate a consolidated set of error correction data (described in more detail below). As one option, the NCC 150 can transmit the consolidated set of error correction data to the geosynchronous (geostationary) relay satellite 160 via the satellite uplink channel 151. In another option, the NCC 150 can make the consolidated set of error correction data available to a rover via the Internet.

The key distinction between the PPP system and the typical SBAS, despite similarity in infrastructure, is better accuracy as a result of higher quality correction data. The SBAS can provide positioning accuracy, on the order of a meter or better; whereas, the PPP system is capable of delivering decimeter level positioning accuracy. In certain cases, PPP correction data sets can make possible carrier phase ambiguity resolution, thus leading to centimeter level positioning accuracy (similar to RTK).

The consolidated set of error correction data in a PPP system can be partitioned into a few groups. The consolidated set of error correction data can include:
- Corrections to orbital (trajectory) parameters of GNSS satellites specified in the processing of measurements from a group of base stations;
- Corrections to clock parameters of GNSS satellites, specified in the processing of measurements from a group of base stations;
- Corrections for residual uncompensated errors of GNSS measurements; and
- Other error correction data.

Each navigation satellite in a global navigation satellite system can transmit signals on one or more frequency bands (for example, on the L1, L2, and L5 frequency bands). To simplify the terminology herein, a navigation receiver is also referred to simply as a receiver. A single-band receiver receives and processes signals on one frequency band (such as L1); a multi-band receiver receives and processes signals on two or more frequency bands (such as L1, L2, and L5). A single-system receiver receives and processes signals from a single GNSS (such as GPS); a multi-system receiver receives and process signals from two or more GNSSs (such as GPS, GLONASS, and GALILEO).

Figure 2:
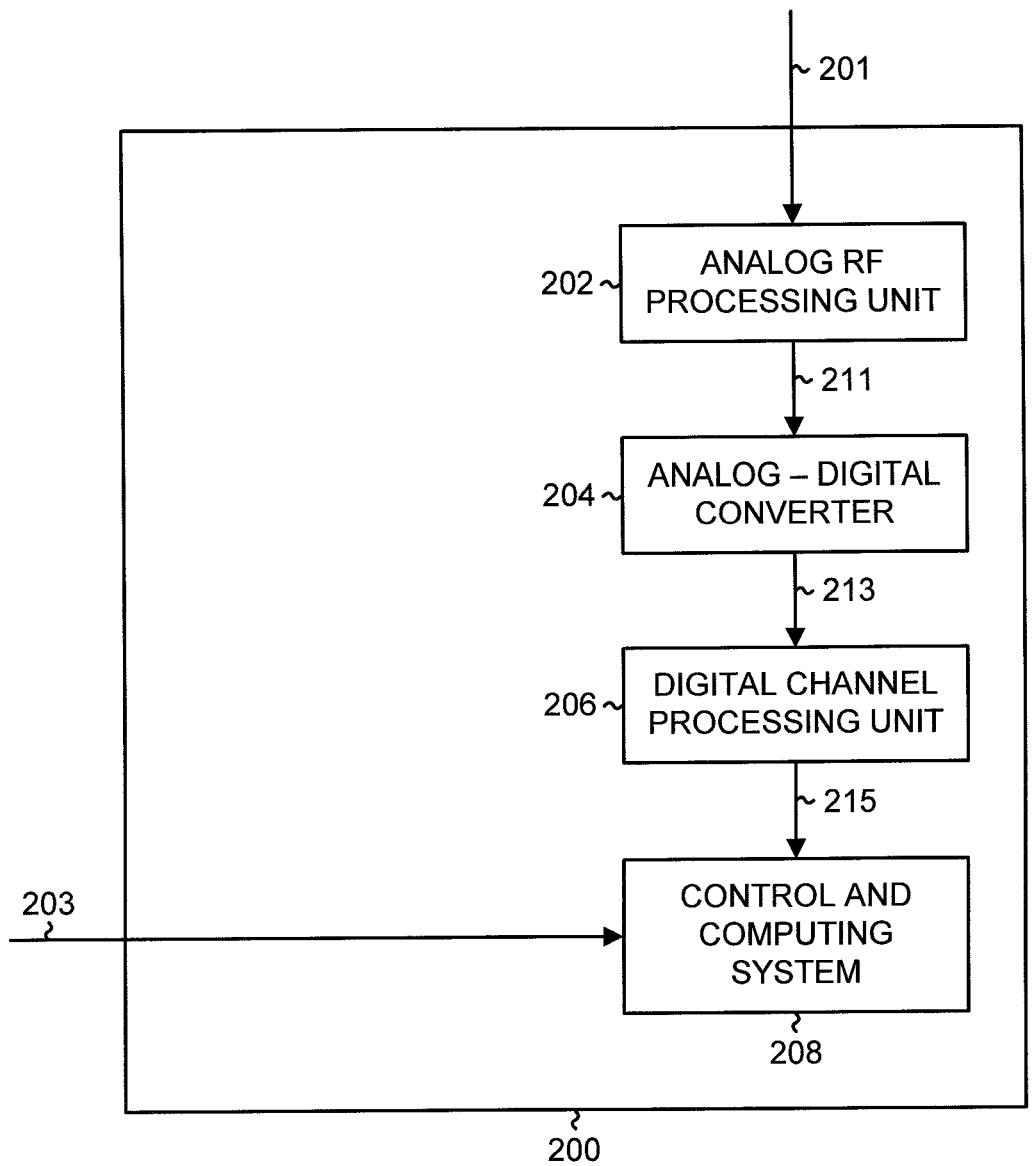
FIG. 2 shows a high level schematic functional block diagram of a navigation receiver.

FIG. 2 shows a high-level schematic functional block diagram of an example of a receiver, denoted as the receiver 200. The input analog signal 201 represents the total signal (also referred to as the combined signal, aggregate signal, or composite signal) of all the navigation signals received by the antenna (not shown) coupled to the receiver 200. For the example shown in FIG. 1A, the input analog signal 201 includes the navigation signal 103A-navigation signal 103F. The input analog signal 201 is first inputted into the analog radiofrequency (RF) processing unit 202. In the analog RF processing unit 202, the input analog signal 201 is amplified by a low-noise amplifier, filtered by a RF bandpass filter, and mixed with a local oscillator signal to generate an intermediate signal with an upconverted frequency and an intermediate signal with a downconverted frequency. An intermediate frequency bandpass filter removes the intermediate signal with the upconverted frequency and outputs the intermediate signal with the downconverted frequency; this output signal is denoted as the output analog signal 211.

The output analog signal 211 is inputted into the analog-digital converter (ADC) 204, which digitizes the analog signal 211. The output digital signal 213 is then inputted into the digital channel processing unit 206, which processes navigation data used for solving navigation tasks. The navigation data includes GNSS information (such as satellite ephemeris and satellite clock parameters) encoded on the navigation signals. The navigation data also includes code phase measurements (that is, delay times used to determine pseudo-ranges) calculated from delay-locked loops (DLLs). If the navigation receiver processes carrier phases, the navigation data also includes carrier phase measurements calculated from phase-locked loops (PLLs).

The output digital signal 215 is inputted into the control and computing system 208, which computes target parameters such as position, velocity, and time offset. If the receiver operates in a differential navigation mode, the control and computing system 208 receives the error correction data 203, used to compute target parameters with better accuracy. In the single-base-station DN system shown in FIG. 1A, the error correction data 203 would be received from the communications transceiver 126 in the rover 120. In the network DN system shown in FIG. 1B, the error correction data would be received from the communications transceiver 196 in the rover 190. In the network DN system shown in FIG. 1C, the error correction data 203 would be received from the satellite signal 161.

Figure 3:
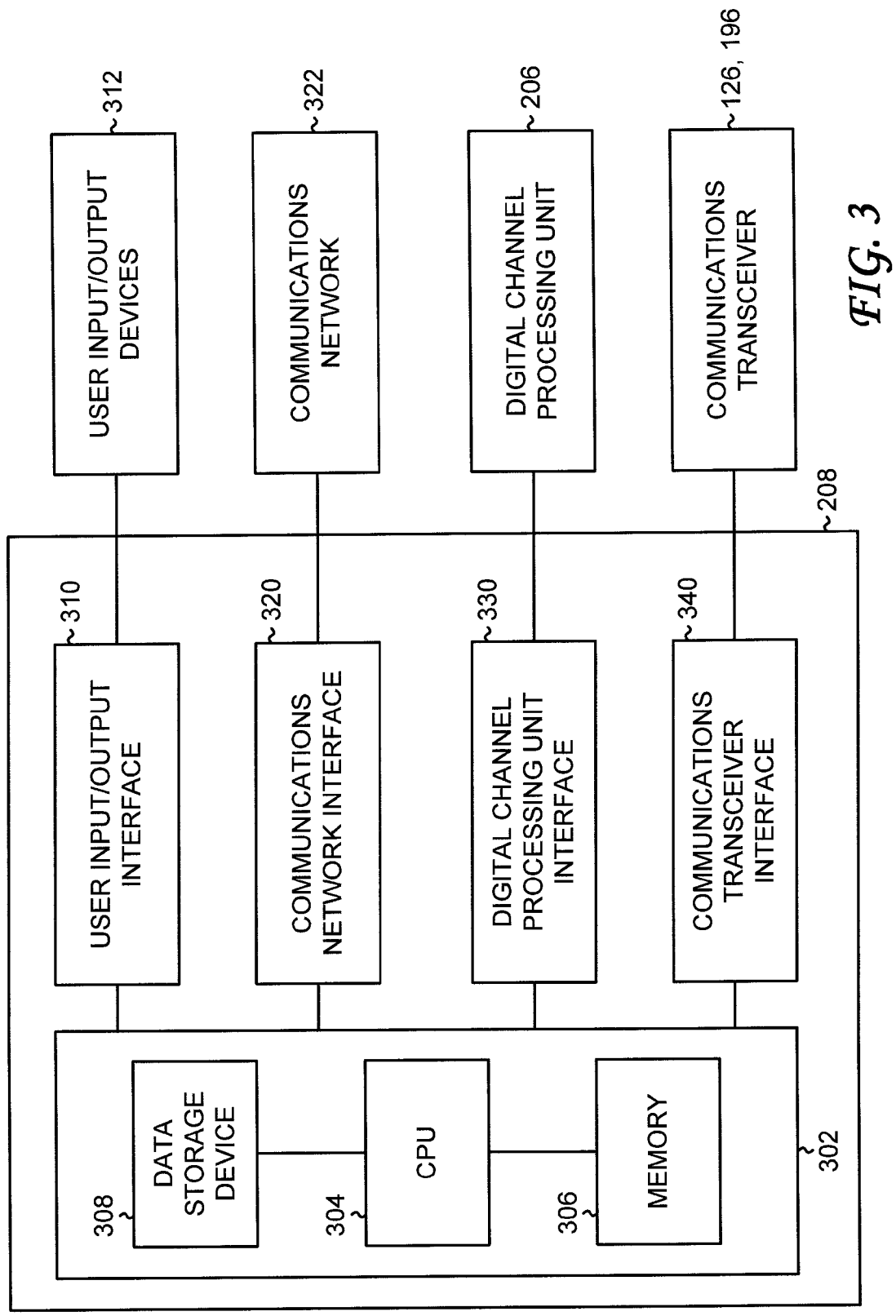
FIG. 3 shows a high level schematic functional block diagram of a control and computing system implemented with a computer.

An embodiment of the control and computing system 208 is shown in FIG. 3. One skilled in the art can construct the control and computing system 208 from various combinations of hardware, firmware, and software. One skilled in the art can construct the control and computing system 208 from various electronic components, including one or more general purpose processors (such as microprocessors), one or more digital signal processors, one or more application-specific integrated circuits (ASICs), and one or more field-programmable gate arrays (FPGAs).

The control and computing system 208 includes a computer 302, which includes a processor [referred to as the central processing unit (CPU)] 304, memory 306, and a data storage device 308. The data storage device 308 includes at least one persistent, non-transitory, tangible computer readable medium, such as non-volatile semiconductor memory, a magnetic hard drive, or a compact disc read only memory.

The control and computing system 208 further includes a user input/output interface 310, which interfaces the computer 302 to user input/output devices 312. Examples of user input/output devices 312 include a keyboard, a mouse, a local access terminal, and a video display. Data, including computer executable code, can be transferred to and from the computer 302 via the user input/output interface 310.

The control and computing system 208 further includes a communications network interface 320, which interfaces the computer 302 with a communications network 322. Examples of the communications network 322 include a local area network and a wide area network. A user can access the computer 302 via a remote access terminal (not shown) communicating with the communications network 322. Data, including computer executable code, can be transferred to and from the computer 302 via the communications network interface 320.

The control and computing system 208 further includes a data channel processing unit interface 330, which interfaces the computer 302 with the digital channel processing unit 206 (see FIG. 2).

The control and computing system 208 further includes a communications transceiver interface 340, which interfaces the computer 302 with a communications transceiver, such as the communications transceiver 126 (see FIG. 1) or the communications transceiver 196 (see FIG. 1B).

As is well known, a computer operates under control of computer software, which defines the overall operation of the computer and applications. The CPU 304 controls the overall operation of the computer and applications by executing computer program instructions that define the overall operation and applications. The computer program instructions can be stored in the data storage device 308 and loaded into the memory 306 when execution of the program instructions is desired. The algorithms described below can be defined by computer program instructions stored in the memory 306 or in the data storage device 308 (or in a combination of the memory 306 and the data storage device 308) and controlled by the CPU 304 executing the computer program instructions. For example, the computer program instructions can be implemented as computer executable code programmed by one skilled in the art to perform algorithms. Accordingly, by executing the computer program instructions, the CPU 304 executes the algorithms described below.

A method for generating and maintaining an optimum measurement subset, according to an embodiment of the invention, is now described.

At a particular instant in time, assume that the number of GNSS satellites in view is $N_{sat}$, where $N_{sat}$ is an integer, typically greater than or equal to 4. A GNSS satellite is in view if the antenna receives a line-of-sight navigation signal from that satellite. The receiver processes the navigation signals to generate a set of GNSS measurements from the set of GNSS satellites and computes desired target parameters (such as position, velocity, and time) within certain accuracy.

The total number of available GNSS measurements depends on the number of satellites in view and on the number of frequency bands over which GNSS measurements are made for each satellite in view. Assume that the receiver operates over $N_f$ frequency bands, where $N_f$ is an integer greater than or equal to 1. Then the total number of available GNSS measurements is $N=N_f N_{sat}$.

The general problem addressed herein can then be formulated as follows. The total number of available GNSS measurements is N. Assume that, with given constraints of computational resources and computational time, only n GNSS measurements (where n is an integer, and n<N) are to be selected for computing a target parameter within a specified accuracy. Examples of target parameters include position, velocity, and time. Which subset of n GNSS measurements selected from the set of available N GNSS measurements will yield the highest accuracy for the target parameter? This subset is referred to as the optimum measurement subset for the target parameter; to simplify the terminology, this subset is also referred to as the optimum measurement subset. In an embodiment of the invention, measurements are sequentially removed one-by-one from the set of available N GNSS measurements until the desired optimum measurement subset of n measurements is attained. The algorithms described below for selecting the individual measurement to remove at a particular step are more computationally efficient than previously available ones. In the attempt to be computationally efficient, the algorithms are based on approximations; therefore, the algorithms generate a quasi-optimal measurement subset.

Since the mutual geometry of GNSS and user receiver changes in time, algorithms are used to update the optimum measurement subset at different time instants (for example, at each epoch). In addition to changes in the optimum measurement subset resulting from changes in the mutual geometry, the optimum measurement subset can change, for example, due to changes in the satellite constellation in view, changes in signal conditions, and changes in measurement weights. Changes in the satellite constellation in view can result, for example, from the following events: (1) changes in the geometry of the satellite constellation due to satellite motion, (2) addition of new satellites to the satellite constellation (satellites that previously were not in view now appear in view), and (3) removal of satellites from the satellite constellation (satellites that were previously in view now disappear from view). Changes in signal conditions can result, for example, from interference, shading, and multipath reflections. Changes in measurement weights, for example, can be based on knowledge of measurement error values.

In an embodiment of the invention, an initial set of N available GNSS measurements is reduced to an optimum measurement subset of n measurements, where n<N, by sequentially removing measurements one-by-one. The measurement to be removed at each step is selected such that the increase in the value of a parameter referred to as accuracy criterion (AC) is minimized. Details of AC are described below. As the value of AC decreases, the accuracy increases; therefore, low values of AC are desirable. When a measurement is removed, the number of measurements decreases, and the value of AC increases. Therefore, the measurement to be removed at each step is selected to minimize the increase in the value of AC.

When measurements are lost (as a result of a satellite disappearing from view, for example) such that the number of remaining measurements is less than n, additional measurements are sequentially added one-by-one until the number of measurements used for processing target parameters returns to n. When a measurement is added, the number of measurements increases, and the value of AC decreases. Therefore, the measurement to be added at each step is selected such that the decrease in the value of AC is maximized.

According to an embodiment of the invention, once an optimum measurement subset has been generated, it is monitored to determine whether there is a new (improved or better) optimum measurement subset due to the changes discussed above.

A method for monitoring and updating an optimum measurement subset is performed as follows. First generate a preliminary measurement subset by sequentially adding to the current optimum measurement subset an additional number, $\Delta n$, of measurements such that, at each step, the decrease in the value of AC is maximized. Then generate a trial measurement subset by sequentially removing $\Delta n$ measurements from the preliminary measurement subset such that, at each step, the increase in the value of AC is minimized. There is a non-zero probability that the added satellites will differ from the removed satellites. Then compare the value of AC of the trial measurement subset with the value of AC of the previous optimum measurement subset. If the value of AC for the trial measurement subset is less than the value of AC for the previous optimum measurement subset, then the trial measurement subset is accepted as the new current optimum measurement subset. If the value of AC for the trial measurement subset is equal to or greater than the value of AC for the previous optimum measurement subset, then the previous optimum measurement subset is retained as the current optimum measurement subset.

For the sequential one-by-one addition or the sequential one-by-one removal of measurements, computationally efficient formulas are used for calculating the covariance and updating the value of AC. The formulas are based on rank-one inverse matrix update (modification), as described below.

In an embodiment of the invention, the approach for selecting the optimum measurement subset is based on the Least Squares Method (LSM). In accordance with the LSM, $\hat{x}$ is the estimate of the vector of unknowns (the unknowns correspond to the target parameters);
y is the measurement vector; and
$\hat{x}$ and y are related by the expression:

$$\hat{x} := (H^T \cdot W \cdot H)^{-1} H^T \cdot W \cdot y. \quad (E7)$$

Here:
x:=y denotes the assignment operation (assign the value y to the variable x), which is equivalent to the storage operation (store the value y in x);
H is the design matrix; and
W is the weight matrix.

The weight matrix can be constructed in a variety of ways. Typically, the weight matrix is given by:

$$W = \mathrm{diag}(w), \quad (E8)$$

where:
$w = [w_1 \ldots w_N]$ is the weight diagonal vector;
$w_i = \sigma_i^{-2}$ is the weight (inverse to covariance);
i is an integer index from 1 to N;
N is the number of all available measurements; and
$N_{sat}$ is the number of satellites in view.

The covariance matrix for a given estimate of unknowns is $$P := (H^T \cdot W \cdot H)^{-1}. \quad (E9)$$

In general, the design matrix is a matrix of partial derivatives of measurements with respect to unknowns. As a specific example, if only single frequency pseudo-range measurements are available, and the Cartesian coordinates (x, y, z) of the user receiver in the ECEF reference frame are to be determined, the design matrix H can be expressed as a matrix of directional cosines augmented with a column of 1's:

$$H = \begin{bmatrix} h_x^1 & h_y^1 & h_z^1 & 1 \\ h_x^2 & h_y^2 & h_z^2 & 1 \\ \vdots & \vdots & \vdots & \vdots \\ h_x^s & h_x^s & h_x^s & 1 \\ \vdots & \vdots & \vdots & \vdots \\ h_x^{N_{sat}} & h_y^{N_{sat}} & h_z^{N_{sat}} & 1 \end{bmatrix} \quad (E10)$$

Here $h_x^s, h_y^s, h_z^s$ represent the directional cosines of the lines between the s-th satellite and the user receiver position with respect to reference Cartesian x, y, z axes.

In the algorithms below, the following notation is used:
n is the specified (desired) number of measurements to be selected;
$[I] = [i_1, i_2, \ldots, i_k]$, where k is an integer, denotes an array of indices; and
$[a:b] = [a, a+1, a+2, \ldots, b-1, b]$ denotes an interval of indices.

Assume index [I] is a first set of integers and index [J] is a second set of integers, then
$[I] \cup [J]$ represents the union of [I] and [J];
$[I] \cap [J]$ represents the intersection of [I] and [J];
$[I] \backslash [J]$ represents the difference of the two sets of indexes; and
$|[I]|$ denotes the length of [I], where the length of an empty index is zero.

In an embodiment of the invention, the accuracy criterion (AC) is evaluated as follows:

$$AC = tr(P, [L]) = \sum_{l \in [L]} [P]_{l,l}, \quad (E11)$$

where:
tr(A,[L]) denotes the trace of matrix A over indexed diagonal elements; and
$[A]_{i,j}$ denotes the (i, j)-th element of matrix A.

For [L]=[1:3], AC=PDOP, where PDOP refers to Position Dilution of Precision; here, "position" refers to three-dimensional coordinates. For [L]=[1:4], AC=GDOP, where GDOP refers to Geometrical Dilution of Precision; here, "geometrical" refers to three-dimensional coordinates plus time. For [L]=[4], AC=TDOP, where TDOP refers to Time Dilution of Precision.

In the algorithms below, the following additional notation is used:
$H_{[I],:}$ denotes a matrix formed from rows of matrix H which correspond to index $[I] = [i_1, i_2, \ldots, i_k]$ (that is, $H_{[I],:}$ refers to a submatrix with rows with index [I] and all columns);
$w_{[I]}$ denotes a vector formed from elements of vector w that correspond to index $[i] = [i_1, i_2, \ldots, i_k]$; and $$W_{[I]} = \mathrm{diag}(w_{[I]}).$$

The covariance matrix and AC evaluated on a subset [I] of a set of measurements are denoted as follows:
$P_{[I]}$ denotes the covariance matrix evaluated on a subset [I] of the set of measurements, where:

$$P_{[I]} = (H_{[I],:}^T W_{[I]} H_{[I],:})^{-1}. \quad (E12)$$

$AC_{[I]}$ denotes the AC evaluated on a subset [I] of the set of measurements, where:

$$AC_{[I]} = tr(P_{[I]}, [L]) = \sum_{i \in [L]} [P_{[I]}]_{i,i}. \qquad (E13)$$

For a column vector:

$$|v|_{[L]}^2 = \sum_{i \in [L]} ([v]_i)^2$$

denotes the norm of vector V over its first three elements; and $[v]_i$ denotes the i-th element of vector V.

Two auxiliary algorithms are introduced: one to treat a decrease in the number of measurements, and one to treat an increase in the number of measurements.

Decrease in Number of Measurements.

Consider a set of measurements with index $[I_0]$. The relation between target parameters and measurements is specified via a matrix H and a weight vector W. Search a subset of measurements with index $[I] \subset [I_0]$ of size n such that the value of AC is a minimum. The algorithm is denoted as [I]:=decrease(H, w, n, $[I_0]$). To find the optimum measurement subset, the algorithm for a decrease in the number of measurements is used. The algorithm is expressed below in pseudo-code.

Algorithm for [I]:=decrease(H, w, n, $[I_0]$). For simplicity, this algorithm is referred to as the "Decrease Algorithm".

```
Algorithm begins.
Step 0. Initialization.
    [I] := [I₀];
    P := (H_{[I],:}^T diag(w_{[I]}) H_{[I],:})^{-1};
    AC := tr(P, [L]);
    m := |[I]|.
If m = 4, exit. A measurement cannot be deleted, because a minimum of
four measurements is required.
Step 1. Search for Measurement to Remove.
    δ_min = +∞, c_min = 0, v_min = 0, i_min = -1;
    for each i in [I] do
        h := [H_{[i],:}]^T;
        v := P · h;
        r := 1 / ([w]_i);
        c := 1 / (r - h^T · v);
        δ := c · |v|_{[L]}^2
        if δ < δ_min
            δ_min := δ;
            c_min := c;
            v_min := v;
            i_min := i;
        end
    end
If i_min = -1, exit with no solution.
Step 2. Remove Measurement.
    P := P + c_min · v_min · v_min^T;
    AC := AC + δ_min;
    [I] := [I] \ [i_min];
    m := m - 1;
If m ≤ n, exit. The indices of selected measurements are stored in [I].
Otherwise, return to Step 1.
Algorithm ends.
```

Increase in Number of Measurements.

Consider a set of measurements with index $[I_0]$. The relation between target parameters and measurements is specified via a matrix H and a weight vector w. Search a subset of measurements with index $[I] \supset [I_0]$ of size n such that the value of AC is a minimum. The algorithm is denoted as [I]:=increase(H, n, $[I_0]$). The algorithm is expressed below in pseudo-code.

Algorithm for [I]:=increase(H, n, $[I_0]$). For simplicity, this algorithm is referred to as the "Increase Algorithm".

```
Algorithm begins.
Step 0. Initialization.
    [I] := [I₀];
    P := (H_{[I],:}^T diag(w_{[I]}) H_{[I],:})^{-1};
    AC := tr(P, [L]); and
    m := |[I]|.
If m = N, exit. Since N is the maximum available number of
measurements, additional measurements cannot be added.
Step 1. Search for Measurement to Add.
    δ_max = 0, c_max = 0, v_max = 0, i_max = -1;
    for each i in [1 : N] \ [I] do
        h := [H_{[i],:}]^T;
        v := P · h;
        r := 1 / ([w]_i);
        c := 1 / (r + h^T · v);
        δ := c · |v|_{[L]}^2
        if δ > δ_max
            δ_max := δ;
            c_max := c;
            v_max := v;
            i_max := i;
        end
    end
If i_max = -1, exit with no solution.
Step 2. Add Measurement.
    P := P - c_max v_max · v_max^T;
    AC := AC - δ_max;
    [I] := [I] ∪ [i_max];
    m := m + 1;
If m ≥ n, exit. The indices of selected measurements are stored in [I].
Otherwise, return to Step 1.
Algorithm ends.
```

Once the initial optimum measurement subset has been generated, the next stage of the process monitors and updates the optimum measurement subset. Consider changes as a function of time. In a GNSS, time is referenced in discrete intervals referred to as epochs. If the duration of one epoch is $\Delta t_{epoch}$, the time can be referenced as $t_k = k \Delta t_{epoch}$, where k is an integer referred to as the epoch number (also referred to as the epoch count). Assume that an optimum measurement subset from the set of all available measurements is referenced via index $[I_{k-1}]$ at time $t_{k-1}$. At time $t_{k-1}$, $|[I_{k-1}]| = n$ measurements, where n is the specified (desired) number of measurements to use for processing values of target parameters. Consider the following scenarios.

Measurement Disappeared.

At the current epoch number k, some of the measurements in the previous optimum measurement subset have disappeared: $[\tilde{I}_k] \subset [I_{k-1}]$. An additional number of measurements, $n - |[\tilde{I}_k]|$, need to be added to return to an optimum measurement subset with n measurements. For this process, the $[I_k]$:=increase($H_k$, n, $[\tilde{I}_k]$) algorithm described above is used.

Optimum Measurement Subset Update.

Assume that an optimum measurement subset has been determined. As discussed above, however, there is a non-zero probability that an improved optimum measurement subset can be found. The procedure for updating the optimum measurement subset is the following. Add a few measurements such that the number of measurements is greater than n and then decrease the number of measurements back to n. There is a non-zero probability that the particular measurements added and the particular measurements removed are not the same. After an update procedure, the value of AC can increase, decrease, or stay the same. The value of AC after the update procedure is compared with the value of AC before the update procedure. If the value of AC decreases, then the update is accepted; and the updated optimum measurement subset becomes the current optimum measurement subset. If the value of AC increases or if the value of AC stays the same, the update is not accepted; and the previous optimum measurement subset is retained. Adding measurements can be made with the [I]:=increase(H, n,[I$_0$]) algorithm given above or with a random selection of measurements. The number of measurements to be added or deleted also can be chosen randomly.

The flowchart in FIG. 4A-FIG. 4D summarizes a method, according to an embodiment of the invention, for generating and maintaining an optimum measurement subset. [In FIG. 4A-FIG. 4D, the indices "A", "B", "C", and "D" enclosed in hexagons are used only to assist in aligning the sections of the flowchart. They do not refer to drawing elements; they are not used in the description; and they are not assigned reference numbers.]

Since the method can accommodate various combinations of operational modes and measurements, the following terminology is used herein. "GNSS measurements" refer to code phase measurements or a combination of code phase measurements and carrier phase measurements. In a stand-alone mode, only GNSS measurements are available. In a differential navigation (DN) mode, if error correction data is available for the GNSS measurements, then the GNSS measurements are corrected with the error correction data to generate "corrected GNSS measurements", where "corrected GNSS measurements" refer to corrected code phase measurements or a combination of corrected code phase measurements and corrected carrier phase measurements. In a DN mode, however, it is possible that error correction data is available for some GNSS measurements, and error correction data is not available for other GNSS measurements. To cover the various combinations of operational modes and measurements, "input GNSS measurements" refer to GNSS measurements or corrected GNSS measurements or a combination of GNSS measurements and corrected GNSS measurements.

Each input GNSS measurement is associated with a corresponding measurement weight (a measurement weight is also referred to simply as a weight). These weights are used in (E8). Weights can be determined by various criteria prior to the algorithm for generating and maintaining an optimum measurement subset. In one example, an input GNSS measurement from a satellite at a low elevation angle is assigned a lower weight than an input GNSS measurement from a satellite at a high elevation angle. In a second example, an input GNSS measurement from a signal with a low signal-to-noise ratio (SNR) is assigned a lower weight than an input GNSS measurement from a signal with a high SNR. In a third example, an input GNSS measurement from a signal with a low signal power is assigned a lower weight than an input GNSS measurement from a signal with a high signal power. In a fourth example, an input GNSS measurement from one satellite system (such as GLONASS) is assigned a lower weight than an input GNSS measurement from a second satellite system (such as GPS). Additional criteria can also be used for determining weights in a DN mode; for example, if error correction data is not available for all input GNSS measurements, then an input GNSS measurement with no corresponding error correction data is assigned a lower weight than an input GNSS measurement with corresponding error correction data. The weight can also depend on specific information in the error correction data. Combinations of criteria can also be used for determining weights. An input GNSS measurement, together with its associated corresponding measurement weight, is referred to herein as a weighted input GNSS measurement. In some cases, the measurement weights can be equal to unity.

Figure 4A:
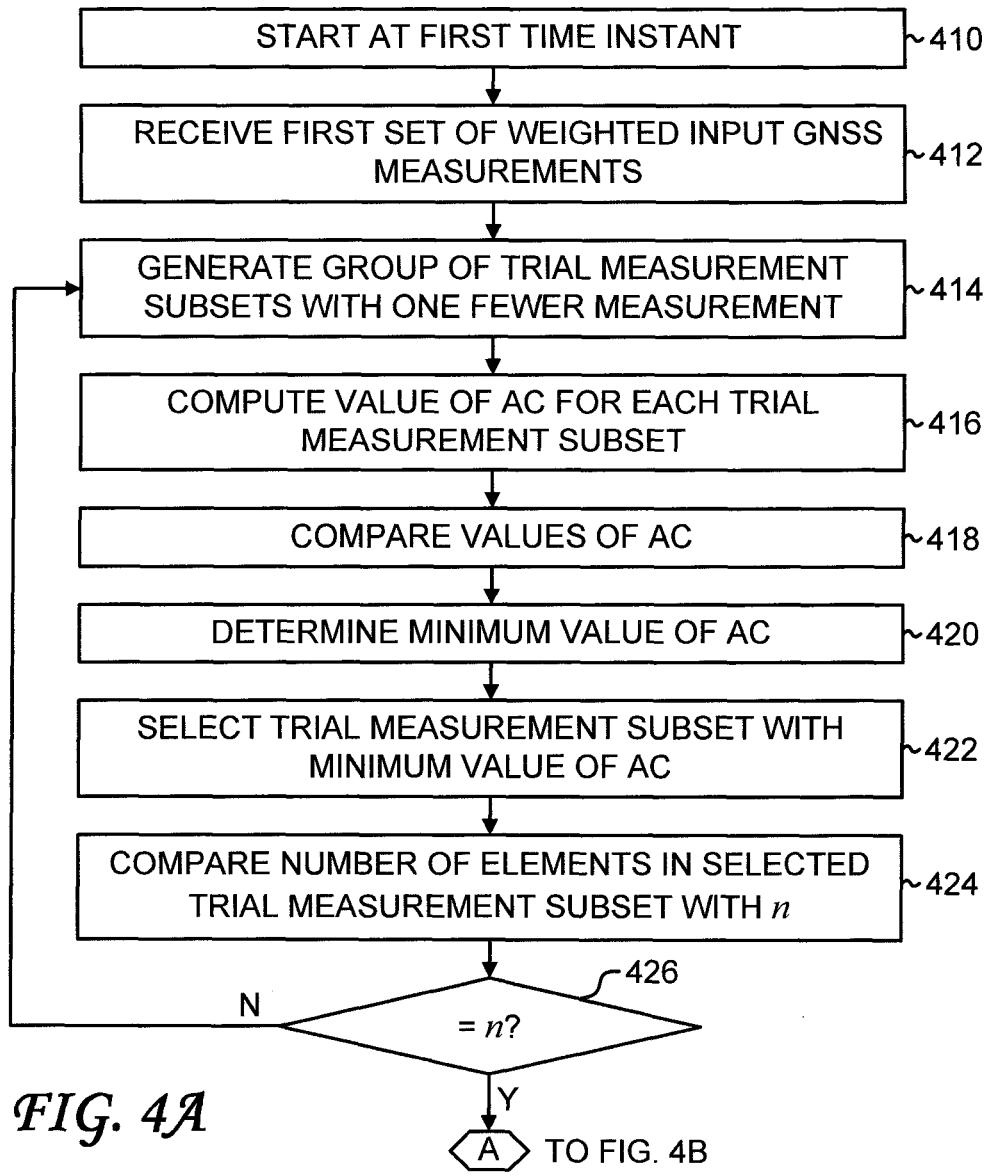
FIG. 4A-FIG. 4D show a flowchart of a method for generating and maintaining an optimum measurement subset.
Figure 4B:
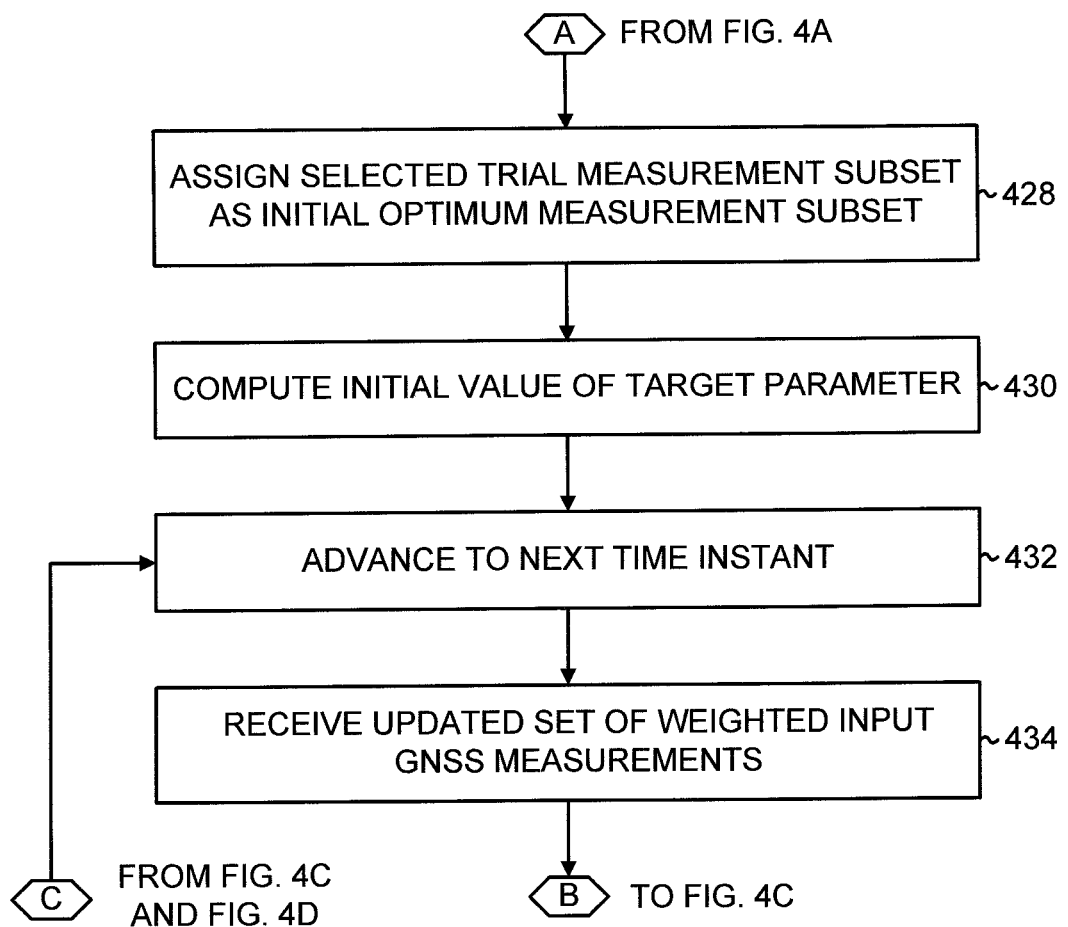

Refer to FIG. 4A. In step 410, the process starts at a first time instant (for example, a first epoch). In step 412, a first set of weighted input GNSS measurements is received at the control and computing system 208 (FIG. 2). The number of elements in the first set of weighted input GNSS measurements is an integer N. Each weighted input GNSS measurement corresponds to a specific navigation satellite and to a specific signal frequency.

Step 414-step 426 are then performed iteratively to generate an optimum measurement subset from the set of N weighted input GNSS measurements. The number of elements in the optimum measurement subset is a specified (desired) integer n, where $4 \leq n < N$. The integer n is specified (for example, by a control engineer) to be large enough to attain a specified accuracy and small enough to allow computation of target parameters within a specified time interval, given the computational resources of the receiver. To illustrate the algorithms, a simplified example is described below in which an optimum measurement subset with n=7 elements is generated from an initial set of N=10 weighted input GNSS measurements.

In step 414, a group of trial measurement subsets with one fewer measurement than the previous measurement subset is generated. In the first iteration, the previous measurement subset corresponds to the set of N weighted input GNSS measurements. Therefore, a group of N trial measurement subsets with N−1 elements is generated. Each trial measurement subset is generated by removing a different individual weighted input GNSS measurement from the initial set of N weighted input GNSS measurements.

For N=10, the individual weighted input GNSS measurements (M) are denoted as ($M_1,M_2,M_3,M_4,M_5,M_6,M_7,M_8,M_9,M_{10}$). There are then 10 trial measurement subsets (TMS) with N−1=9 elements each; these are denoted as:

$TMS_1=(M_2,M_3,M_4,M_5,M_6,M_7,M_8,M_9,M_{10})$
$TMS_2=(M_1,M_3,M_4,M_5,M_6,M_7,M_8,M_9,M_{10})$
$TMS_3=(M_1,M_2,M_4,M_5,M_6,M_7,M_8,M_9,M_{10})$
$TMS_4=(M_1,M_2,M_3,M_5,M_6,M_7,M_8,M_9,M_{10})$
$TMS_5=(M_1,M_2,M_3,M_4,M_6,M_7,M_8,M_9,M_{10})$
$TMS_6=(M_1,M_2,M_3,M_4,M_5,M_7,M_8,M_9,M_{10})$
$TMS_7=(M_1,M_2,M_3,M_4,M_5,M_6,M_8,M_9,M_{10})$
$TMS_8=(M_1,M_2,M_3,M_4,M_5,M_6,M_7,M_9,M_{10})$
$TMS_9=(M_1,M_2,M_3,M_4,M_5,M_6,M_7,M_8,M_{10})$
$TMS_1=(M_1,M_2,M_3,M_4,M_5,M_6,M_7,M_8,M_9)$

The process then passes to step 416, in which the value of accuracy criterion (AC) for each trial measurement subset is computed. Although the value of AC can be calculated for each trial measurement subset from (E11), the computational efficiency can be increased by calculating the value of AC from (E11) for only the initial set of N weighted input GNSS measurements. The values of AC for trial measurement subsets with fewer elements can then be efficiently calculated using the Decrease Algorithm described above.

The value of AC for a trial measurement subset (TMS) is denoted as AC[TMS]. The values of AC for the 10 trial measurement subsets are then:

$AC[TMS_1]=AC_1$;
$AC[TMS_2]=AC_2$;
$AC[TMS_3]=AC_3$;
$AC[TMS_4]=AC_4$;
$AC[TMS_5]=AC_5$;
$AC[TMS_6]=AC_6$;
$AC[TMS_7]=AC_7$;
$AC[TMS_8]=AC_8$;
$AC[TMS_9]=AC_9$;
$AC[TMS_{10}]=AC_{10}$

The process then passes to step 418 in which the values of AC are compared and to step 420 in which the minimum value of AC is determined. Assume that $AC_4$ is the minimum value of AC. The process then passes to step 422, in which the trial measurement subset with the minimum value of AC is selected for further processing; in this example, the trial measurement subset $TMS_4$ is selected.

The process then passes to step 424, in which the number of elements in the selected TMS is compared with the integer n. The process then passes to the decision step 426. If the number of elements in the selected TMS is not equal to n, then the process returns to step 414 for another iteration. If the number of elements in the selected TMS is equal to n, then the process passes to step 428 in FIG. 4B. In this instance, the number of elements in the trial measurement subset $TMS_4$ is 9, which is not equal to n=7; therefore, the process returns to step 414 for another iteration.

Starting with
$$TMS_4=(M_1,M_2,M_3,M_5,M_6,M_7,M_8,M_9,M_{10})$$
a group of N−1 trial measurement subsets with N−2 elements each is generated. Each trial measurement subset is generated by removing a different individual weighted input GNSS measurement from the initial subset of N−1 weighted input GNSS measurements. In this example, there are 9 trial measurement subsets with 8 elements each:

$TMS_{4,1}=(M_2,M_3,M_5,M_6,M_7,M_8,M_9,M_{10})$;
$TMS_{4,2}=(M_1,M_3,M_5,M_6,M_7,M_8,M_9,M_{10})$;
$TMS_{4,3}=(M_1,M_2,M_5,M_6,M_7,M_8,M_9,M_{10})$;
$TMS_{4,4}=(M_1,M_2,M_3,M_6,M_7,M_8,M_9,M_{10})$;
$TMS_{4,5}=(M_1,M_2,M_3,M_5,M_7,M_8,M_9,M_{10})$;
$TMS_{4,6}=(M_1,M_2,M_3,M_5,M_6,M_7,M_9,M_{10})$;
$TMS_{4,7}=(M_1,M_2,M_3,M_5,M_6,M_7,M_9,M_{10})$;
$TMS_{4,8}=(M_1,M_2,M_3,M_5,M_6,M_7,M_8,M_{10})$;
$TMS_{4,9}=(M_1,M_2,M_3,M_5,M_6,M_7,M_8,M_9)$;

The process then passes to step 416, in which the value of AC for each trial measurement subset is computed. The values of AC for the 9 trial measurement subsets are then:

$AC[TMS_{4,1}]=AC_{4,1}$;
$AC[TMS_{4,2}]=AC_{4,2}$;
$AC[TMS_{4,3}]AC_{4,3}$;
$AC[TMS_{4,4}]AC_{4,4}$;
$AC[TMS_{4,5}]AC_{4,5}$;
$AC[TMS_{4,6}]AC_{4,6}$;
$AC[TMS_{4,7}]=AC_{4,7}$;
$AC[TMS_{4,8}]AC_{4,8}$;
$AC[TMS_{4,9}]AC_{4,9}$.

The process then passes to step 418 in which the values of AC are compared and to step 420 in which the minimum value of AC is determined. Assume that $AC_{4,7}$ is the minimum value of AC. The process then passes to step 422, in which the trial measurement subset with the minimum value of AC is selected for further processing; in this example, the trial measurement subset $TMS_{4,7}$ is selected.

The process then passes to step 424, in which the number of elements in the selected trial measurement subset $TMS_{4,7}$ is compared with the integer n=7. The process then passes to the decision step 426. Since the number of elements in the selected trial measurement subset $TMS_{4,7}$ is 8 and not equal to 7, then the process returns to step 414 for another iteration.

Starting with
$$TMS_{4,7}=(M_1,M_2,M_3,M_5,M_6,M_7,M_9,M_{10}),$$
a group of N−2 trial measurement subsets with N−3 elements each is generated. Each trial measurement subset is generated by removing a different individual weighted input GNSS measurement from the initial subset of N−2 weighted input GNSS measurements. In this example, there are 8 trial measurement subsets with 7 elements each:

$TMS_{4,7,1}=(M_2,M_3,M_5,M_6,M_7,M_9,M_{10})$;
$TMS_{4,7,2}=(M_1,M_3,M_5,M_6,M_7,M_9,M_{10})$
$TMS_{4,7,3}=(M_1,M_2,M_5,M_6,M_7,M_9,M_{10})$;
$TMS_{4,7,4}=(M_1,M_2,M_3,M_6,M_7,M_9,M_{10})$;
$TMS_{4,7,5}=(M_1,M_2,M_3,M_5,M_7,M_9,M_{10})$;
$TMS_{4,7,6}=(M_1,M_2,M_3,M_5,M_6,M_9,M_{10})$;
$TMS_{4,7,7}=(M_1,M_2,M_3,M_5,M_6,M_7,M_{10})$;
$TMS_{4,7,8}=(M_1,M_2,M_3,M_5,M_6,M_7,M_9)$;

The process then passes to step 416, in which the value of AC for each trial measurement subset is computed. The values of AC for the 8 trial measurement subsets are then:

$AC[TMS_{4,7,1}]=AC_{4,7,1}$;
$AC[TMS_{4,7,2}]=AC_{4,7,2}$;
$AC[TMS_{4,7,3}]=AC_{4,7,3}$;
$AC[TMS_{4,7,4}]=AC_{4,7,4}$;
$AC[TMS_{4,7,5}]=AC_{4,7,5}$;
$AC[TMS_{4,7,6}]=AC_{4,7,6}$;
$AC[TMS_{4,7,7}]=AC_{4,7,7}$;
$AC[TMS_{4,7,8}]=AC_{4,7,8}$.

The process then passes to step 418 in which the values of AC are compared and to step 420 in which the minimum value of AC is determined. Assume that $AC_{4,7,5}$ is the minimum value of AC. The process then passes to step 422, in which the trial measurement subset with the minimum value of AC is selected for further processing; in this example, the trial measurement subset $TMS_{4,7,5}$ is selected.

The process then passes to step 424, in which the number of elements in the selected trial measurement subset $TMS_{4,7,5}$ is compared with the integer n=7. The process then passes to the decision step 426. Since the number of elements in the selected trial measurement subset $TMS_{4,7,5}$ is equal to 7, then the process passes to step 428 in FIG. 4B.

In step 428, the selected trial measurement subset $TMS_{4,7,5}$ is assigned as the initial optimum measurement subset. The process then passes to step 430, in which the initial value of the target parameter is computed from the initial optimum measurement subset. The process then passes to step 432, in which the time is advanced to the next time instant (for example, the next epoch).

The process then passes to step 434, in which an updated set of weighted input GNSS measurements is received. The process then passes to step 440 in FIG. 4C. In step 440, the number of weighted input GNSS measurements in the updated previous optimum measurement subset is checked to determine whether the number of weighted input GNSS measurements has decreased below the specified number n (when the values of weighted input GNSS measurements are updated in step 434, some weighted input GNSS measurements may no longer be available, due to, for example, a satellite disappearing from view). The process then passes to the decision step 442.

If the number has decreased, then the process passes to step 470, in which weighted input GNSS measurements are added to the updated previous optimum measurement subset to generate a new optimum measurement subset with n elements. New weighted input GNSS measurements are added sequentially one-by-one until a total of n elements is reached. The specific weighted input GNSS measurement added at each sequence is selected such that the value of AC of the resulting measurement subset is minimized. To increase the computational efficiency, the Increase Algorithm described above can be used for calculating values of AC for trial measurement subsets.

In this example, the initial optimum measurement subset generated in step 428 was
$$TMS_{4,7,5}|_{t=t_1}=(M_1,M_2,M_3,M_5,M_7,M_9,M_{10})|_{t=t_1}.$$
Here, the first time instant $t=t_1$ is explicitly denoted. Now assume that in step 434, two weighted input GNSS measurements, $M_1$ and $M_5$, have been lost. The resulting updated previous optimum measurement subset at the second time instant $t=t_2$ is then:
$$TMS_{4,7,5}|_{t=t_2}=(M_2,M_3,M_7,M_9,M_{10})|_{t=t_2}.$$
Since the updated previous optimum measurement subset $TMS_{4,7,5}|_{t=t_2}$ has only 5 elements, an additional 2 elements need to be added to generate a new optimum measurement subset with the required number of 7 elements.

Assume that weighted input GNSS measurements $M_4$, $M_6$, and $M_8$ with values updated to $t=t_2$ are available and that a new weighted input GNSS measurement $M_{11}$ is available at $t=t_2$ (for example, a new satellite has appeared in view). A group of 4 trial measurement subsets with 6 elements is generated by adding $M_4$, $M_6$, $M_8$, and $M_{11}$, respectively, to the updated previous optimum measurement subset $TMS_{4,7,5}|_{t=t_2}$:
$$TMS_{4,7,5,1}|_{t=t_2}=(M_2,M_3,M_4,M_7,M_9,M_{10})|_{t=t_2};$$
$$TMS_{4,7,5,2}|_{t=t_2}=(M_2,M_3,M_6,M_7,M_9,M_{10})|_{t=t_2};$$
$$TMS_{4,7,5,3}|_{t=t_2}=(M_2,M_3,M_7,M_8,M_9,M_{10})|_{t=t_2};$$
$$TMS_{4,7,5,4}|_{t=t_2}=(M_2,M_3,M_7,M_9,M_{10},M_{11})|_{t=t_2}.$$
The value of AC for each trial measurement subset is computed. The values of AC for the 4 trial measurement subsets are then:
$$AC[TMS_{4,7,5,1}]=AC_{4,7,5,1};$$
$$AC[TMS_{4,7,5,2}]=AC_{4,7,5,2};$$
$$AC[TMS_{4,7,5,3}]=AC_{4,7,5,3};$$
$$AC[TMS_{4,7,5,4}]=AC_{4,7,5,4}.$$
To simplify the AC expressions, the time index $|_{t=t_2}$ has been dropped. The minimum value of AC is then determined. Assume that $AC_{4,7,5,3}$ is the minimum value; the trial measurement subset $TMS_{4,7,5,3}$ is then selected for further processing.

Starting with the trial measurement subset $TMS_{4,7,5,3}$, a group of 3 trial measurement subsets with 7 elements each is generated by adding $M_4$, $M_6$, and $M_{11}$, respectively, to $TMS_{4,7,5,3}|_{t=t_2}$:
$$TMS_{4,7,5,3,1}|_{t=t_2}=(M_2,M_3,M_4,M_7,M_8,M_9,M_{10})|_{t=t_2};$$
$$TMS_{4,7,5,3,2}|_{t=t_2}=(M_2,M_3,M_6,M_7,M_8,M_9,M_{10})|_{t=t_2};$$
$$TMS_{4,7,5,3,3}|_{t=t_2}=(M_2,M_3,M_7,M_8,M_9,M_{10},M_{11})|_{t=t_2}.$$
The value of AC for each trial measurement subset is computed. The values of AC for the 3 trial measurement subsets are then:
$$AC[TMS_{4,7,5,3,1}]=AC_{4,7,5,3,1};$$
$$AC[TMS_{4,7,5,3,2}]=AC_{4,7,5,3,2};$$
$$AC[TMS_{4,7,5,3,3}]=AC_{4,7,5,3,3}.$$
To simplify the AC expressions, the time index $|_{t=t_2}$ has been dropped. The minimum value of AC is then determined. Assume that $AC_{4,7,5,3,2}$ is the minimum value; the trial measurement subset $TMS_{4,7,5,3,2}$ is then selected as the new optimum measurement subset with 7 elements.

The process then passes to step 472, in which the new optimum measurement subset is assigned as the current optimum measurement subset. The process then passes to step 474, in which the current value of the target parameter is computed from the current optimum measurement subset. The process then returns to step 432 in FIG. 4B for the next iteration.

Figure 4C:
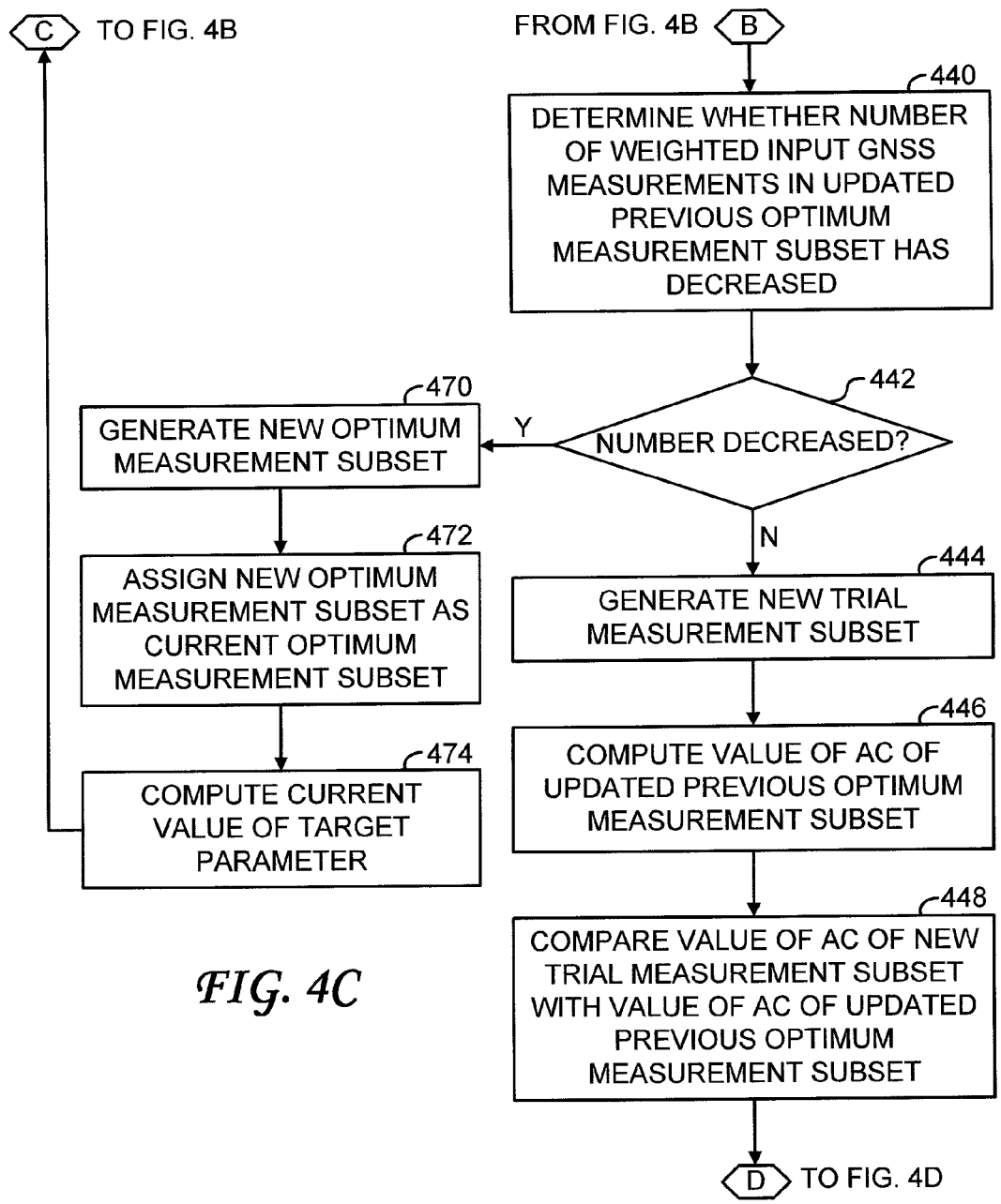

Refer back to the decision step 442 in FIG. 4C. If the number of measurements has not decreased, then the process passes to step 444, in which a new trial measurement subset is generated to determine whether an improved optimum measurement subset is available. The new trial measurement subset is generated by adding a number, $\Delta n$, of new weighted input GNSS measurements to the previous optimum measurement subset to generate a preliminary measurement subset with $n+\Delta n$ elements. The number $\Delta n$ can be selected by various rules. As one example, it is a specified integer; for example, $\Delta n=3$. As another example, it is randomly selected from an interval of integers bounded by specified integers $(\Delta n)_1$ and $(\Delta n)_2$: $(\Delta n)_1 \le \Delta n \le (\Delta n)_2$; for example, $\Delta n$ is randomly selected from the interval $2 \le \Delta n \le 6$. The value of $\Delta n$ can be reset at each iteration of step 444. Weighted input GNSS measurements are added sequentially one-by-one until $\Delta n$ weighted input GNSS measurements have been added. At each sequence, the specific weighted input GNSS measurement added is selected such that the AC of the resulting measurement subset is minimized.

A number $\Delta n$ of weighted input GNSS measurements is then removed from the preliminary measurement subset to generate the new trial measurement subset with n elements. Weighted input GNSS measurements are removed sequentially one-by-one until $\Delta n$ weighted input GNSS measurements have been removed. At each sequence, the weighted input GNSS measurement removed is selected such that the AC of the resulting measurement subset is minimized. There is a non-zero probability that the weighted input GNSS measurements added are different from the weighted input GNSS measurements removed; therefore, there is a non-zero probability that the trial measurement subset is different from the previous optimum measurement subset. To increase the computational efficiency, the Increase Algorithm and the Decrease Algorithm described above can be used for calculating values of AC for trial measurement subsets.

In the example, the optimum measurement subset with updated values of measurements generated in step 434 for $t=t_2$ is
$$TMS_{4,7,5}|_{t=t_2}=(M_1,M_2,M_3,M_5,M_7,M_9,M_{10})|_{t=t_2}.$$
Assume in this example that $\Delta n=2$. Also assume that weighted input GNSS measurements $M_4$, $M_6$, and $M_8$ with values updated to $t=t_2$ are available and that a new weighted input GNSS measurement $M_{11}$ is available at $t=t_2$ (for example, a new satellite has appeared in view). A group of 4 trial measurement subsets with 8 elements is generated by adding $M_4$, $M_6$, $M_8$, and $M_{11}$, respectively, to $TMS_{4,7,5}|_{t=t_2}$:
$$TMS_{4,7,5,1}|_{t=t_2}=(M_1,M_2,M_3,M_4,M_5,M_7,M_9,M_{10})|_{t=t_2};$$
$$TMS_{4,7,5,2}|_{t=t_2}=(M_1,M_2,M_3,M_5,M_6,M_7,M_9,M_{10})|_{t=t_2};$$
$$TMS_{4,7,5,3}|_{t=t_2}=(M_1,M_2,M_3,M_5,M_7,M_8,M_9,M_{10})|_{t=t_2};$$
$$TMS_{4,7,5,4}|_{t=t_2}=(M_1,M_2,M_3,M_5,M_7,M_9,M_{10},M_{11})|_{t=t_2};$$
The value of AC for each trial measurement subset is computed. The values of AC for the 4 trial measurement subsets are then:
$$AC[TMS_{4,7,5,1}]=AC_{4,7,5,1};$$
$$AC[TMS_{4,7,5,2}]=AC_{4,7,5,2};$$
$$AC[TMS_{4,7,5,3}]=AC_{4,7,5,3};$$
$$AC[TMS_{4,7,5,4}]=AC_{4,7,5,4}.$$
To simplify the AC expressions, the time index $|_{t=t_2}$ has been dropped. The minimum value of AC is then determined. Assume that $AC_{4,7,5,3}$ is the minimum value; the trial measurement subset $TMS_{4,7,5,3}$ is then selected for further processing.

Starting with the trial measurement subset $TMS_{4,7,5,3}$, a group of 3 trial measurement subsets with 9 elements each is generated by adding $M_4$, $M_6$, and $M_{11}$, respectively, to $TMS_{4,7,5,3}|_{t=t_2}$:
$$TMS_{4,7,5,3,1}|_{t=t_2}=(M_1,M_2,M_3,M_4,M_5,M_7,M_8,M_9,M_{10})|_{t=t_2};$$
$$TMS_{4,7,5,3,2}|_{t=t_2}=(M_1,M_2,M_3,M_5,M_6,M_7,M_8,M_9,M_{10})|_{t=t_2};$$
$$TMS_{4,7,5,3,3}|_{t=t_2}=(M_1,M_2,M_3,M_5,M_7,M_8,M_9,M_{10},M_{11})|_{t=t_2}.$$

The value of AC for each trial measurement subset is computed. The values of AC for the 3 trial measurement subsets are then:

$AC[TMS_{4,7,5,3,1}] = AC_{4,7,5,3,1}$;
$AC[TMS_{4,7,5,3,2}] = AC_{4,7,5,3,2}$;
$AC[TMS_{4,7,5,3,3}] = AC_{4,7,5,3,3}$.

To simplify the AC expressions, the time index $|_{t=t_2}$ has been dropped. The minimum value of AC is then determined. Assume that $AC_{4,7,5,3,3}$ is the minimum value; the trial measurement subset $TMS_{4,7,5,3,3}$ is then selected for further processing.

Starting with the trial measurement subset $TMS_{4,7,5,3,3}$, a group of 9 trial measurement subsets with 8 elements is then generated by removing $M_1$, $M_2$, $M_3$, $M_5$, $M_7$, $M_8$, $M_9$, $M_{10}$, and $M_{11}$, respectively, from $TMS_{4,7,5,3,3}$:

$TMS_{4,7,5,3,3,1}|_{t=t_2} = (M_2, M_3, M_5, M_7, M_8, M_9, M_{10}, M_{11})|_{t=t_2}$;

...

$TMS_{4,7,5,3,3,4}|_{t=t_2} = (M_1, M_2, M_3, M_7, M_8, M_9, M_{10}, M_{11})|_{t=t_2}$;

...

$TMS_{4,7,5,3,3,9}|_{t=t_2} = (M_1, M_2, M_3, M_5, M_7, M_8, M_9, M_{10})|_{t=t_2}$.

The value of AC for each trial measurement subset is computed. The values of AC for the trial measurement subsets are then:

$AC[TMS_{4,7,5,3,3,1}] = AC_{4,7,5,3,3,1}$;

...

$AC[TMS_{4,7,5,3,3,4}] = AC_{4,7,5,3,3,4}$;

...

$AC[TMS_{4,7,5,3,3,9}] = AC_{4,7,5,3,3,9}$.

To simplify the AC expressions, the time index $|_{t=t_2}$ has been dropped. The minimum value of AC is then determined. Assume that $AC_{4,7,5,3,3,4}$ is the minimum value; the trial measurement subset $TMS_{4,7,5,3,3,4}$ is then selected for further processing.

Starting with the trial measurement subset $TMS_{4,7,5,3,3,4}$, a group of 8 trial measurement subsets with 7 elements is then generated by removing $M_1$, $M_2$, $M_3$, $M_7$, $M_8$, $M_9$, $M_{10}$, and $M_{11}$, respectively, from $TMS_{4,7,5,3,3,4}$:

$TMS_{4,7,5,3,3,4,1}|_{t=t_2} = (M_2, M_3, M_7, M_8, M_9, M_{10}, M_{11})|_{t=t_2}$;

...

$TMS_{4,7,5,3,3,4,4}|_{t=t_2} = (M_1, M_2, M_3, M_8, M_9, M_{10}, M_{11})|_{t=t_2}$;

...

$TMS_{4,7,5,3,3,4,8}|_{t=t_2} = (M_1, M_2, M_3, M_7, M_8, M_9, M_{10})|_{t=t_2}$.

The value of AC for each trial measurement subset is computed. The values of AC for the trial measurement subsets are then:

$AC[TMS_{4,7,5,3,3,4,1}] = AC_{4,7,5,3,3,4,1}$;

...

$AC[TMS_{4,7,5,3,3,4,4}] = AC_{4,7,5,3,3,4,4}$;

...

$AC[TMS_{4,7,5,3,3,4,8}] = AC_{4,7,5,3,3,4,8}$.

To simplify the AC expressions, the time index $|_{t=t_2}$ has been dropped. The minimum value of AC is then determined. Assume that $AC_{4,7,5,3,3,4,4}$ is the minimum value; the new trial measurement subset $TMS_{4,7,5,3,3,4,4}|_{t=t_2}$ is then selected as the new trial measurement subset (with 7 elements) for further processing.

The process then passes to step 446, in which the value of AC of the updated previous optimum measurement subset $TMS_{4,7,5}|_{t=t_2}$ is computed:

$AC[TMS_{4,7,5}|_{t=t_2}] = AC_{4,7,5}|_{t=t_2}$.

Here the time index is explicitly kept. The process then passes to step 448, in which the value of AC of the new trial measurement subset $(AC_{4,7,5,3,3,4,4}|_{t=t_2})$ is compared with the value of AC of the updated previous optimum measurement subset $(AC_{4,7,5}|_{t=t_2})$.

Figure 4D:
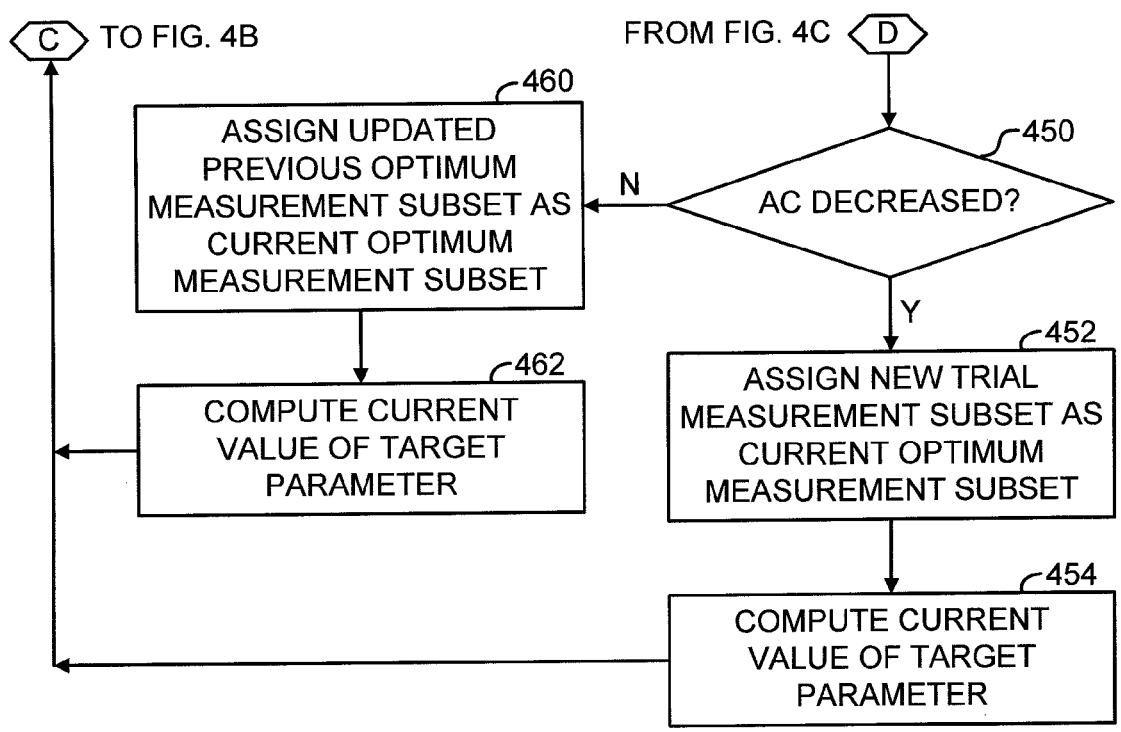

The process then passes to the decision step 450 in FIG. 4D. If the value of AC has not decreased $(AC_{4,7,5,3,3,4,4}|_{t=t_2} \geq AC_{4,7,5}|_{t=t_2})$, then the process passes to step 460, in which the updated previous optimum measurement subset $TMS_{4,7,5}|_{t=t_2}$ is assigned as the current optimum measurement subset. The process then passes to step 462, in which the current value of the target parameter is computed from the current optimum measurement subset. The process then returns to step 432 in FIG. 4B for the next iteration.

Refer back to the decision step 450. If the value of the AC has <decreased $(AC_{4,7,5,3,4,4}|_{t=t_2} < AC_{4,7,5}|_{t=t_2})$, then the process passes to step 452, in which the new trial measurement subset $TMS_{4,7,5,3,3,4,4}|_{t=t_2}$ is assigned as the current optimum measurement subset. The process then passes to step 454, in which the current value of the target parameter is calculated from the current optimum measurement subset. The process then returns to step 432 in FIG. 4B for the next iteration.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for generating an optimum measurement subset from a set of weighted input global navigation satellite system (GNSS) measurements, wherein the number of weighted input GNSS measurements in the set of weighted input GNSS measurements is a first integer, wherein the number of weighted input GNSS measurements in the optimum measurement subset is a specified second integer, and wherein the specified second integer is less than the first integer, the method comprising:

performing the steps of:
  receiving the set of weighted input GNSS measurements;
  generating a group of trial measurement subsets by removing a different individual weighted input GNSS measurement from the set of weighted input GNSS measurements;
  for each trial measurement subset in the group of trial measurement subsets, calculating a value of accuracy criterion for at least one target parameter;
  determining a minimum value of accuracy criterion based on the values of accuracy criterion calculated for each trial measurement subset in the group of trial measurement subsets; and
  assigning the trial measurement subset having the minimum value of accuracy criterion as a current selected trial measurement subset; and
iteratively performing the steps of:
  determining whether the number of weighted input GNSS measurements in the current selected trial measurement subset is equal to the specified second integer;
  upon determining that the number of weighted input GNSS measurements in the current selected trial measurement subset is equal to the specified second integer:
    assigning the current selected trial measurement subset as the optimum measurement subset; and
  upon determining that the number of weighted input GNSS measurements in the current selected trial measurement subset is not equal to the specified second integer:
    generating a new group of trial measurement subsets from the current selected trial measurement subset by removing a different individual weighted GNSS measurement from the current selected trial measurement subset;
    for each trial measurement subset in the new group of trial measurement subsets, calculating the value of accuracy criterion for the at least one target parameter;
    determining a new minimum value of accuracy criterion based on the values of accuracy criterion calculated for each trial measurement subset in the new group of trial measurement subsets; and
  assigning the trial measurement subset with the new minimum value of accuracy criterion as the current selected trial measurement subset;
wherein the set of weighted input GNSS measurements corresponds to a first time instant, and wherein the optimum measurement subset is a first optimum measurement subset, further comprising:
  receiving a set of updated weighted input GNSS measurements corresponding to a second time instant;
  generating an updated first optimum measurement subset by updating values of the weighted input GNSS measurements in the first optimum measurement subset;
  determining whether the number of updated weighted input GNSS measurements in the updated first optimum measurement subset is less than the specified second integer; and
  upon determining that the number of updated weighted input GNSS measurements in the updated first optimum measurement subset is less than the specified second integer:
    performing the steps of:
      generating a group of trial updated measurement subsets from the updated first optimum measurement subset by adding a different individual updated weighted GNSS measurement to the updated first optimum measurement subset;
      for each trial updated measurement subset in the group of trial updated measurement subsets, calculating the value of accuracy criterion for the at least one target parameter; and
      determining a minimum value of accuracy criterion based on the values of accuracy criterion calculated for each trial updated measurement subset in the group of trial updated measurement subsets; and
      assigning the trial updated measurement subset with the minimum value of accuracy criterion as a current selected trial updated measurement subset; and
    iteratively performing the steps of:
      determining whether the number of updated weighted input GNSS measurements in the current selected trial updated measurement subset is equal to the specified second integer;
      upon determining that the number of updated weighted input GNSS measurements in the current selected trial updated measurement subset is equal to the specified second integer:
        assigning the current selected trial updated measurement subset as a second optimum measurement subset; and
      upon determining that the number of updated weighted input GNSS measurements in the current selected trial updated measurement subset is not equal to the specified second integer:
        generating a new group of updated trial measurement subsets from the current selected updated trial measurement subset by adding a different individual updated weighted GNSS measurement to the current selected trial updated measurement subset;
        for each trial updated measurement subset in the new group of trial updated measurement subsets, calculating the value of accuracy criterion for the at least one target parameter;
        determining a new minimum value of accuracy criterion based on the values of accuracy criterion calculated for each trial updated measurement subset in the new group of trial updated measurement subsets; and
        assigning the trial updated measurement subset with the new minimum value of accuracy criterion as the current selected trial updated measurement subset.

2. The method of claim 1, wherein the at least one target parameter is selected from the group consisting of:
  a one-dimensional position;
  a two-dimensional position;
  a three-dimensional position; and
  a time offset from a GNSS time.

3. The method of claim 1, further comprising:
  calculating a value of the at least one target parameter based on the optimum measurement subset.

4. The method of claim 1, further comprising:
  calculating an updated value of the at least one target parameter based on the second optimum measurement subset.

5. A method for generating an optimum measurement subset from a set of weighted input global navigation satellite system (GNSS) measurements, wherein the number of weighted input GNSS measurements in the set of weighted input GNSS measurements is a first integer, wherein the number of weighted input GNSS measurements in the optimum measurement subset is a specified second integer, and wherein the specified second integer is less than the first integer, the method comprising:

performing the steps of:
receiving the set of weighted input GNSS measurements;
generating a group of trial measurement subsets by removing a different individual weighted input GNSS measurement from the set of weighted input GNSS measurements;
for each trial measurement subset in the group of trial measurement subsets, calculating a value of accuracy criterion for at least one target parameter;
determining a minimum value of accuracy criterion based on the values of accuracy criterion calculated for each trial measurement subset in the group of trial measurement subsets; and
assigning the trial measurement subset having the minimum value of accuracy criterion as a current selected trial measurement subset; and iteratively performing the steps of:
determining whether the number of weighted input GNSS measurements in the current selected trial measurement subset is equal to the specified second integer;
upon determining that the number of weighted input GNSS measurements in the current selected trial measurement subset is equal to the specified second integer:
assigning the current selected trial measurement subset as the optimum measurement subset; and
upon determining that the number of weighted input GNSS measurements in the current selected trial measurement subset is not equal to the specified second integer:
generating a new group of trial measurement subsets from the current selected trial measurement subset by removing a different individual weighted GNSS measurement from the current selected trial measurement subset;
for each trial measurement subset in the new group of trial measurement subsets, calculating the value of accuracy criterion for the at least one target parameter;
determining a new minimum value of accuracy criterion based on the values of accuracy criterion calculated for each trial measurement subset in the new group of trial measurement subsets; and
assigning the trial measurement subset with the new minimum value of accuracy criterion as the current selected trial measurement subset;

wherein the set of weighted input GNSS measurements corresponds to a first time instant, and wherein the optimum measurement subset is a first optimum measurement subset, further comprising:
receiving a set of updated weighted input GNSS measurements corresponding to a second time instant;
generating an updated first optimum measurement subset by updating values of the weighted input GNSS measurements in the first optimum measurement subset;
determining whether the number of updated weighted input GNSS measurements in the updated first optimum measurement subset is equal to the specified second integer; and
upon determining that the number of updated weighted input GNSS measurements in the updated first optimum measurement subset is equal to the specified second integer:
generating a preliminary measurement subset, wherein the number of updated weighted input GNSS measurements in the preliminary measurement subset is a specified third integer, wherein the specified third integer is greater than the specified second integer, and wherein the step of generating a preliminary measurement subset comprises:
performing the steps of:
generating a group of trial updated measurement subsets from the updated first optimum measurement subset by adding a different individual updated weighted GNSS measurement to the updated first optimum measurement subset;
for each trial updated measurement subset in the group of trial updated measurement subsets, calculating the value of accuracy criterion for the at least one target parameter;
determining a minimum value of accuracy criterion based on the values of accuracy criterion calculated for each trial updated measurement subset in the group of trial updated measurement subsets; and
assigning the trial updated measurement subset with the minimum value of accuracy criterion as a current selected trial updated measurement subset; and
iteratively performing the steps of:
determining whether the number of updated weighted input GNSS measurements in the current selected trial updated measurement subset is equal to the specified third integer;
upon determining that the number of updated weighted input GNSS measurements in the current selected trial updated measurement subset is equal to the specified third integer:
assigning the current selected trial updated measurement subset as the preliminary measurement subset; and
upon determining that the number of updated weighted input GNSS measurements in the current selected trial updated measurement subset is not equal to the specified third integer:
generating a new group of updated trial measurement subsets from the current selected updated trial measurement subset by adding a different individual updated weighted GNSS measurement to the current selected trial updated measurement subset;
for each trial updated measurement subset in the new group of trial updated measurement subsets, calculating the value of accuracy criterion for the at least one target parameter;
determining a new minimum value of accuracy criterion based on the values of accuracy criterion calculated for each trial updated measurement subset in the new group of trial updated measurement subsets; and assigning the trial updated measurement subset with the new minimum value of accuracy criterion as the current selected trial updated measurement subset; and generating a second optimum measurement subset from the preliminary measurement subset, wherein the number of updated weighted input GNSS measurements in the second optimum measurement subset is equal to the specified second integer, and wherein the step of generating a second optimum measurement subset from the preliminary measurement subset comprises:

performing the steps of:
generating a group of trial updated measurement subsets from the preliminary measurement subset by removing a different individual updated weighted GNSS measurement from the preliminary measurement subset;
for each trial updated measurement subset in the group of trial updated measurement subsets, calculating the value of accuracy criterion for the at least one target parameter;
determining a minimum value of accuracy criterion based on the values of accuracy criterion calculated for each trial updated measurement subset in the group of trial updated measurement subsets; and
assigning the trial updated measurement subset with the minimum value of accuracy criterion as a current selected trial updated measurement subset; and
iteratively performing the steps of:
determining whether the number of updated weighted input GNSS measurements in the current selected trial updated measurement subset is equal to the specified second integer;
upon determining that the number of updated weighted input GNSS measurements in the current selected trial updated measurement subset is equal to the specified second integer:
assigning the current selected trial updated measurement subset as the second optimum measurement subset; and
upon determining that the number of updated weighted input GNSS measurements in the current selected trial updated measurement subset is not equal to the specified second integer:
generating a new group of updated trial measurement subsets from the current selected updated trial measurement subset by removing a different individual updated weighted GNSS measurement from the current selected trial updated measurement subset;
for each trial updated measurement subset in the new group of trial updated measurement subsets, calculating the value of accuracy criterion for the at least one target parameter;
determining a new minimum value of accuracy criterion based on the values of accuracy criterion calculated for each trial updated measurement subset in the new group of trial updated measurement subsets; and
assigning the trial updated measurement subset with the new minimum value of accuracy criterion as the current selected trial updated measurement subset.

6. The method of claim 5, further comprising:
calculating an updated value of the at least one target parameter based on the second optimum measurement subset.

7. The method of claim 5, wherein the at least one target parameter is selected from the group consisting of:
a one-dimensional position;
a two-dimensional position;
a three-dimensional position; and
a time offset from a GNSS time.

8. The method of claim 5, further comprising:
calculating a value of the at least one target parameter based on the optimum measurement subset.

9. An apparatus for generating an optimum measurement subset from a set of weighted input global navigation satellite system (GNSS) measurements, wherein the number of weighted input GNSS measurements in the set of weighted input GNSS measurements is a first integer, wherein the number of weighted input GNSS measurements in the optimum measurement subset is a specified second integer, and wherein the specified second integer is less than the first integer, the apparatus comprising:

means for performing the steps of:
receiving the set of weighted input GNSS measurements;
generating a group of trial measurement subsets by removing a different individual weighted input GNSS measurement from the set of weighted input GNSS measurements;
for each trial measurement subset in the group of trial measurement subsets, calculating a value of accuracy criterion for at least one target parameter;
determining a minimum value of accuracy criterion based on the values of accuracy criterion calculated for each trial measurement subset in the group of trial measurement subsets; and
assigning the trial measurement subset having the minimum value of accuracy criterion as a current selected trial measurement subset; and means for iteratively performing the steps of:
determining whether the number of weighted input GNSS measurements in the current selected trial measurement subset is equal to the specified second integer;
upon determining that the number of weighted input GNSS measurements in the current selected trial measurement subset is equal to the specified second integer:
assigning the current selected trial measurement subset as the optimum measurement subset; and
upon determining that the number of weighted input GNSS measurements in the current selected trial measurement subset is not equal to the specified second integer:
generating a new group of trial measurement subsets from the current selected trial measurement subset by removing a different individual weighted GNSS measurement from the current selected trial measurement subset;
for each trial measurement subset in the new group of trial measurement subsets, calculating the value of accuracy criterion for the at least one target parameter;
determining a new minimum value of accuracy criterion based on the values of accuracy criterion calculated for each trial measurement subset in the new group of trial measurement subsets; and
assigning the trial measurement subset with the new minimum value of accuracy criterion as the current selected trial measurement subset;
wherein the set of weighted input GNSS measurements corresponds to a first time instant, and wherein the optimum measurement subset is a first optimum measurement subset, further comprising:
means for receiving a set of updated weighted input GNSS measurements corresponding to a second time instant;
means for generating an updated first optimum measurement subset by updating values of the weighted input GNSS measurements in the first optimum measurement subset;
means for determining whether the number of updated weighted input GNSS measurements in the updated first optimum measurement subset is less than the specified second integer; and
means for, upon determining that the number of updated weighted input GNSS measurements in the updated first optimum measurement subset is less than the specified second integer:
performing the steps of:
generating a group of trial updated measurement subsets from the updated first optimum measurement subset by adding a different individual updated weighted GNSS measurement to the updated first optimum measurement subset;
for each trial updated measurement subset in the group of trial updated measurement subsets, calculating the value of accuracy criterion for the at least one target parameter; and
determining a minimum value of accuracy criterion based on the values of accuracy criterion calculated for each trial updated measurement subset in the group of trial updated measurement subsets; and
assigning the trial updated measurement subset with the minimum value of accuracy criterion as a current selected trial updated measurement subset; and
iteratively performing the steps of:
determining whether the number of updated weighted input GNSS measurements in the current selected trial updated measurement subset is equal to the specified second integer;
upon determining that the number of updated weighted input GNSS measurements in the current selected trial updated measurement subset is equal to the specified second integer:
assigning the current selected trial updated measurement subset as a second optimum measurement subset; and
upon determining that the number of updated weighted input GNSS measurements in the current selected trial updated measurement subset is not equal to the specified second integer:
generating a new group of updated trial measurement subsets from the current selected updated trial measurement subset by adding a different individual updated weighted GNSS measurement to the current selected trial updated measurement subset;
for each trial updated measurement subset in the new group of trial updated measurement subsets, calculating the value of accuracy criterion for the at least one target parameter;
determining a new minimum value of accuracy criterion based on the values of accuracy criterion calculated for each trial updated measurement subset in the new group of trial updated measurement subsets; and assigning the trial updated measurement subset with the new minimum value of accuracy criterion as the current selected trial updated measurement subset.

10. The apparatus of claim 9, wherein the at least one target parameter is selected from the group consisting of:
a one-dimensional position;
a two-dimensional position;
a three-dimensional position; and
a time offset from a GNSS time.

11. The apparatus of claim 9, further comprising:
means for calculating a value of the at least one target parameter based on the optimum measurement subset.

12. The apparatus of claim 9, further comprising:
means for calculating an updated value of the at least one target parameter based on the second optimum measurement subset.

13. An apparatus for generating an optimum measurement subset from a set of weighted input global navigation satellite system (GNSS) measurements, wherein the number of weighted input GNSS measurements in the set of weighted input GNSS measurements is a first integer, wherein the number of weighted input GNSS measurements in the optimum measurement subset is a specified second integer, and wherein the specified second integer is less than the first integer, the apparatus comprising:
means for performing the steps of:
receiving the set of weighted input GNSS measurements;
generating a group of trial measurement subsets by removing a different individual weighted input GNSS measurement from the set of weighted input GNSS measurements;
for each trial measurement subset in the group of trial measurement subsets, calculating a value of accuracy criterion for at least one target parameter;
determining a minimum value of accuracy criterion based on the values of accuracy criterion calculated for each trial measurement subset in the group of trial measurement subsets; and
assigning the trial measurement subset having the minimum value of accuracy criterion as a current selected trial measurement subset; and
means for iteratively performing the steps of:
determining whether the number of weighted input GNSS measurements in the current selected trial measurement subset is equal to the specified second integer;
upon determining that the number of weighted input GNSS measurements in the current selected trial measurement subset is equal to the specified second integer:
assigning the current selected trial measurement subset as the optimum measurement subset; and
upon determining that the number of weighted input GNSS measurements in the current selected trial measurement subset is not equal to the specified second integer:
generating a new group of trial measurement subsets from the current selected trial measurement subset by removing a different individual weighted GNSS measurement from the current selected trial measurement subset;
for each trial measurement subset in the new group of trial measurement subsets, calculating the value of accuracy criterion for the at least one target parameter;
determining a new minimum value of accuracy criterion based on the values of accuracy criterion calculated for each trial measurement subset in the new group of trial measurement subsets; and assigning the trial measurement subset with the new minimum value of accuracy criterion as the current selected trial measurement subset;
wherein the set of weighted input GNSS measurements corresponds to a first time instant, and wherein the optimum measurement subset is a first optimum measurement subset, further comprising:
  means for receiving a set of updated weighted input GNSS measurements corresponding to a second time instant;
  means for generating an updated first optimum measurement subset by updating values of the weighted input GNSS measurements in the first optimum measurement subset;
  means for determining whether the number of updated weighted input GNSS measurements in the updated first optimum measurement subset is equal to the specified second integer; and
  means for, upon determining that the number of updated weighted input GNSS measurements in the updated first optimum measurement subset is equal to the specified second integer:
    generating a preliminary measurement subset, wherein the number of updated weighted input GNSS measurements in the preliminary measurement subset is a specified third integer, wherein the specified third integer is greater than the specified second integer, and wherein the step of generating a preliminary measurement subset comprises:
      performing the steps of:
        generating a group of trial updated measurement subsets from the updated first optimum measurement subset by adding a different individual updated weighted GNSS measurement to the updated first optimum measurement subset;
        for each trial updated measurement subset in the group of trial updated measurement subsets, calculating the value of accuracy criterion for the at least one target parameter;
        determining a minimum value of accuracy criterion based on the values of accuracy criterion calculated for each trial updated measurement subset in the group of trial updated measurement subsets; and
        assigning the trial updated measurement subset with the minimum value of accuracy criterion as a current selected trial updated measurement subset; and
      iteratively performing the steps of:
        determining whether the number of updated weighted input GNSS measurements in the current selected trial updated measurement subset is equal to the specified third integer;
        upon determining that the number of updated weighted input GNSS measurements in the current selected trial updated measurement subset is equal to the specified third integer:
          assigning the current selected trial updated measurement subset as the preliminary measurement subset; and
        upon determining that the number of updated weighted input GNSS measurements in the current selected trial updated measurement subset is not equal to the specified third integer:
          generating a new group of updated trial measurement subsets from the current selected updated trial measurement subset by adding a different individual updated weighted GNSS measurement to the current selected trial updated measurement subset;
          for each trial updated measurement subset in the new group of trial updated measurement subsets, calculating the value of accuracy criterion for the at least one target parameter;
          determining a new minimum value of accuracy criterion based on the values of accuracy criterion calculated for each trial updated measurement subset in the new group of trial updated measurement subsets; and
          assigning the trial updated measurement subset with the new minimum value of accuracy criterion as the current selected trial updated measurement subset; and
    generating a second optimum measurement subset from the preliminary measurement subset, wherein the number of updated weighted input GNSS measurements in the second optimum measurement subset is equal to the specified second integer, and wherein the step of generating a second optimum measurement subset from the preliminary measurement subset comprises:
      performing the steps of:
        generating a group of trial updated measurement subsets from the preliminary measurement subset by removing a different individual updated weighted GNSS measurement from the preliminary measurement subset;
        for each trial updated measurement subset in the group of trial updated measurement subsets, calculating the value of accuracy criterion for the at least one target parameter;
        determining a minimum value of accuracy criterion based on the values of accuracy criterion calculated for each trial updated measurement subset in the group of trial updated measurement subsets; and
        assigning the trial updated measurement subset with the minimum value of accuracy criterion as a current selected trial updated measurement subset; and
      iteratively performing the steps of:
        determining whether the number of updated weighted input GNSS measurements in the current selected trial updated measurement subset is equal to the specified second integer;
        upon determining that the number of updated weighted input GNSS measurements in the current selected trial updated measurement subset is equal to the specified second integer:
          assigning the current selected trial updated measurement subset as the second optimum measurement subset; and
        upon determining that the number of updated weighted input GNSS measurements in the current selected trial updated measurement subset is not equal to the specified second integer:
          generating a new group of updated trial measurement subsets from the current selected updated trial measurement subset by removing a different individual updated weighted GNSS measurement from the current selected trial updated measurement subset;
          for each trial updated measurement subset in the new group of trial updated measurement subsets, calculating the value of accuracy criterion for the at least one target parameter;

determining a new minimum value of accuracy criterion based on the values of accuracy criterion calculated for each trial updated measurement subset in the new group of trial updated measurement subsets; and assigning the trial updated measurement subset with the new minimum value of accuracy criterion as the current selected trial updated measurement subset.

14. The apparatus of claim 13, further comprising means for calculating an updated value of the at least one target parameter based on the second optimum measurement subset.

15. The apparatus of claim 13, wherein the at least one target parameter is selected from the group consisting of:
a one-dimensional position;
a two-dimensional position;
a three-dimensional position; and
a time offset from a GNSS time.

16. The apparatus of claim 13, further comprising:
means for calculating a value of the at least one target parameter based on the optimum measurement subset.

17. A non-transitory computer readable medium storing computer program instructions for generating an optimum measurement subset from a set of weighted input global navigation satellite system (GNSS) measurements, wherein the number of weighted input GNSS measurements in the set of weighted input GNSS measurements is a first integer, wherein the number of weighted input GNSS measurements in the optimum measurement subset is a specified second integer, and wherein the specified second integer is less than the first integer, the computer program instructions, when executed on a processor, cause the processor to perform operations comprising:

receiving the set of weighted input GNSS measurements;

generating a group of trial measurement subsets by removing a different individual weighted input GNSS measurement from the set of weighted input GNSS measurements;

for each trial measurement subset in the group of trial measurement subsets, calculating a value of accuracy criterion for at least one target parameter;

determining a minimum value of accuracy criterion based on the values of accuracy criterion calculated for each trial measurement subset in the group of trial measurement subsets; and assigning the trial measurement subset having the minimum value of accuracy criterion as a current selected trial measurement subset; and iteratively performing the steps of:

determining whether the number of weighted input GNSS measurements in the current selected trial measurement subset is equal to the specified second integer;

upon determining that the number of weighted input GNSS measurements in the current selected trial measurement subset is equal to the specified second integer:

assigning the current selected trial measurement subset as the optimum measurement subset; and upon determining that the number of weighted input GNSS measurements in the current selected trial measurement subset is not equal to the specified second integer:

generating a new group of trial measurement subsets from the current selected trial measurement subset by removing a different individual weighted GNSS measurement from the current selected trial measurement subset;

for each trial measurement subset in the new group of trial measurement subsets, calculating the value of accuracy criterion for the at least one target parameter;

determining a new minimum value of accuracy criterion based on the values of accuracy criterion calculated for each trial measurement subset in the new group of trial measurement subsets; and assigning the trial measurement subset with the new minimum value of accuracy criterion as the current selected trial measurement subset;

wherein the set of weighted input GNSS measurements corresponds to a first time instant, and wherein the optimum measurement subset is a first optimum measurement subset, and wherein the computer program instructions further comprise computer program instructions defining:

receiving a set of updated weighted input GNSS measurements corresponding to a second time instant;

generating an updated first optimum measurement subset by updating values of the weighted input GNSS measurements in the first optimum measurement subset;

determining whether the number of updated weighted input GNSS measurements in the updated first optimum measurement subset is less than the specified second integer; and upon determining that the number of updated weighted input GNSS measurements in the updated first optimum measurement subset is less than the specified second integer:

performing the steps of:

generating a group of trial updated measurement subsets from the updated first optimum measurement subset by adding a different individual updated weighted GNSS measurement to the updated first optimum measurement subset;

for each trial updated measurement subset in the group of trial updated measurement subsets, calculating the value of accuracy criterion for the at least one target parameter; and determining a minimum value of accuracy criterion based on the values of accuracy criterion calculated for each trial updated measurement subset in the group of trial updated measurement subsets; and assigning the trial updated measurement subset with the minimum value of accuracy criterion as a current selected trial updated measurement subset; and iteratively performing the steps of:

determining whether the number of updated weighted input GNSS measurements in the current selected trial updated measurement subset is equal to the specified second integer;

upon determining that the number of updated weighted input GNSS measurements in the current selected trial updated measurement subset is equal to the specified second integer:

assigning the current selected trial updated measurement subset as a second optimum measurement subset; and upon determining that the number of updated weighted input GNSS measurements in the current selected trial updated measurement subset is not equal to the specified second integer:
  generating a new group of updated trial measurement subsets from the current selected updated trial measurement subset by adding a different individual updated weighted GNSS measurement to the current selected trial updated measurement subset;
  for each trial updated measurement subset in the new group of trial updated measurement subsets, calculating the value of accuracy criterion for the at least one target parameter;
  determining a new minimum value of accuracy criterion based on the values of accuracy criterion calculated for each trial updated measurement subset in the new group of trial updated measurement subsets; and
  assigning the trial updated measurement subset with the new minimum value of accuracy criterion as the current selected trial updated measurement subset.

18. The non-transitory computer readable medium of claim 17, wherein the at least one target parameter is selected from the group consisting of:
  a one-dimensional position;
  a two-dimensional position;
  a three-dimensional position; and
  a time offset from a GNSS time.

19. The non-transitory computer readable medium of claim 17, wherein the computer program instructions further comprise computer program instructions defining:
  calculating a value of the at least one target parameter based on the optimum measurement subset.

20. The non-transitory computer readable medium of claim 17, wherein the computer program instructions further comprise computer program instructions defining:
  calculating an updated value of the at least one target parameter based on the second optimum measurement subset.

21. A non-transitory computer readable medium storing computer program instructions for generating an optimum measurement subset from a set of weighted input global navigation satellite system (GNSS) measurements, wherein the number of weighted input GNSS measurements in the set of weighted input GNSS measurements is a first integer, wherein the number of weighted input GNSS measurements in the optimum measurement subset is a specified second integer, and wherein the specified second integer is less than the first integer, the computer program instructions, when executed on a processor, cause the processor to perform operations comprising:
  receiving the set of weighted input GNSS measurements;
  generating a group of trial measurement subsets by removing a different individual weighted input GNSS measurement from the set of weighted input GNSS measurements;
  for each trial measurement subset in the group of trial measurement subsets, calculating a value of accuracy criterion for at least one target parameter;
  determining a minimum value of accuracy criterion based on the values of accuracy criterion calculated for each trial measurement subset in the group of trial measurement subsets; and
  assigning the trial measurement subset having the minimum value of accuracy criterion as a current selected trial measurement subset; and
  iteratively performing the steps of:
    determining whether the number of weighted input GNSS measurements in the current selected trial measurement subset is equal to the specified second integer;
    upon determining that the number of weighted input GNSS measurements in the current selected trial measurement subset is equal to the specified second integer:
      assigning the current selected trial measurement subset as the optimum measurement subset; and
    upon determining that the number of weighted input GNSS measurements in the current selected trial measurement subset is not equal to the specified second integer:
      generating a new group of trial measurement subsets from the current selected trial measurement subset by removing a different individual weighted GNSS measurement from the current selected trial measurement subset;
      for each trial measurement subset in the new group of trial measurement subsets, calculating the value of accuracy criterion for the at least one target parameter;
      determining a new minimum value of accuracy criterion based on the values of accuracy criterion calculated for each trial measurement subset in the new group of trial measurement subsets; and
  assigning the trial measurement subset with the new minimum value of accuracy criterion as the current selected trial measurement subset;
  wherein the set of weighted input GNSS measurements corresponds to a first time instant, and wherein the optimum measurement subset is a first optimum measurement subset, wherein the computer program instructions further comprise computer program instructions defining:
    receiving a set of updated weighted input GNSS measurements corresponding to a second time instant;
    generating an updated first optimum measurement subset by updating values of the weighted input GNSS measurements in the first optimum measurement subset;
    determining whether the number of updated weighted input GNSS measurements in the updated first optimum measurement subset is equal to the specified second integer; and
    upon determining that the number of updated weighted input GNSS measurements in the updated first optimum measurement subset is equal to the specified second integer:
      generating a preliminary measurement subset, wherein the number of updated weighted input GNSS measurements in the preliminary measurement subset is a specified third integer, wherein the specified third integer is greater than the specified second integer, and wherein the step of generating a preliminary measurement subset comprises:
        performing the steps of:
          generating a group of trial updated measurement subsets from the updated first optimum measurement subset by adding a different individual updated weighted GNSS measurement to the updated first optimum measurement subset;

for each trial updated measurement subset in the group of trial updated measurement subsets, calculating the value of accuracy criterion for the at least one target parameter;
determining a minimum value of accuracy criterion based on the values of accuracy criterion calculated for each trial updated measurement subset in the group of trial updated measurement subsets; and
assigning the trial updated measurement subset with the minimum value of accuracy criterion as a current selected trial updated measurement subset; and
iteratively performing the steps of:
determining whether the number of updated weighted input GNSS measurements in the current selected trial updated measurement subset is equal to the specified third integer;
upon determining that the number of updated weighted input GNSS measurements in the current selected trial updated measurement subset is equal to the specified third integer:
assigning the current selected trial updated measurement subset as the preliminary measurement subset; and
upon determining that the number of updated weighted input GNSS measurements in the current selected trial updated measurement subset is not equal to the specified third integer:
generating a new group of updated trial measurement subsets from the current selected updated trial measurement subset by adding a different individual updated weighted GNSS measurement to the current selected trial updated measurement subset;
for each trial updated measurement subset in the new group of trial updated measurement subsets, calculating the value of accuracy criterion for the at least one target parameter;
determining a new minimum value of accuracy criterion based on the values of accuracy criterion calculated for each trial updated measurement subset in the new group of trial updated measurement subsets; and
assigning the trial updated measurement subset with the new minimum value of accuracy criterion as the current selected trial updated measurement subset; and
generating a second optimum measurement subset from the preliminary measurement subset, wherein the number of updated weighted input GNSS measurements in the second optimum measurement subset is equal to the specified second integer, and wherein the step of generating a second optimum measurement subset from the preliminary measurement subset comprises:
performing the steps of:
generating a group of trial updated measurement subsets from the preliminary measurement subset by removing a different individual updated weighted GNSS measurement from the preliminary measurement subset;
for each trial updated measurement subset in the group of trial updated measurement subsets, calculating the value of accuracy criterion for the at least one target parameter;
determining a minimum value of accuracy criterion based on the values of accuracy criterion calculated for each trial updated measurement subset in the group of trial updated measurement subsets; and
assigning the trial updated measurement subset with the minimum value of accuracy criterion as a current selected trial updated measurement subset; and
iteratively performing the steps of:
determining whether the number of updated weighted input GNSS measurements in the current selected trial updated measurement subset is equal to the specified second integer;
upon determining that the number of updated weighted input GNSS measurements in the current selected trial updated measurement subset is equal to the specified second integer:
assigning the current selected trial updated measurement subset as the second optimum measurement subset; and
upon determining that the number of updated weighted input GNSS measurements in the current selected trial updated measurement subset is not equal to the specified second integer:
generating a new group of updated trial measurement subsets from the current selected updated trial measurement subset by removing a different individual updated weighted GNSS measurement from the current selected trial updated measurement subset;
for each trial updated measurement subset in the new group of trial updated measurement subsets, calculating the value of accuracy criterion for the at least one target parameter;
determining a new minimum value of accuracy criterion based on the values of accuracy criterion calculated for each trial updated measurement subset in the new group of trial updated measurement subsets; and
assigning the trial updated measurement subset with the new minimum value of accuracy criterion as the current selected trial updated measurement subset.

22. The non-transitory computer readable medium of claim 21, wherein the computer program instructions further comprise computer program instructions defining:
calculating an updated value of the at least one target parameter based on the second optimum measurement subset.

* * * * *